US012587762B2

(12) United States Patent
Isoda et al.

(10) Patent No.: US 12,587,762 B2
(45) Date of Patent: Mar. 24, 2026

(54) PHOTOELECTRIC CONVERSION DEVICE AND METHOD OF DRIVING PHOTOELECTRIC CONVERSION DEVICE

(71) Applicant: CANON KABUSHIKI KAISHA, Tokyo (JP)

(72) Inventors: Naoki Isoda, Tokyo (JP); Kazuhiro Morimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 18/760,394

(22) Filed: Jul. 1, 2024

(65) Prior Publication Data

US 2025/0039573 A1      Jan. 30, 2025

(30) Foreign Application Priority Data

Jul. 28, 2023     (JP) .................................. 2023-123110

(51) Int. Cl.
H04N 25/705         (2023.01)
H04N 25/70          (2023.01)
(Continued)

(52) U.S. Cl.
CPC ........... H04N 25/705 (2023.01); H04N 25/77 (2023.01)

(58) Field of Classification Search
CPC ...... H04N 25/77; H04N 25/705; H04N 25/70; H04N 25/767; H04N 25/773; H10F 30/225; H10F 77/959
See application file for complete search history.

(56) References Cited

U.S. PATENT DOCUMENTS

2002/0064072 A1* 5/2002 Ooishi ................. G11C 7/1072
                                                        365/189.05
2017/0237912 A1* 8/2017 Takenaka ............... H04N 25/46
                        (Continued)

FOREIGN PATENT DOCUMENTS

JP       H07-177298 A      7/1995
JP       2002-208292 A     7/2002
                (Continued)

OTHER PUBLICATIONS

Japanese Office Action issued Jun. 3, 2025 during prosecution of related Japanese patent application No. 2023-123110 (English-language machine translation included).

(Continued)

*Primary Examiner* — Marly S Camargo
(74) *Attorney, Agent, or Firm* — VENABLE LLP

(57)                ABSTRACT

A photoelectric conversion device includes pixel circuits arranged to form a plurality of rows and a plurality of columns, and a control circuit for driving the pixel circuits. Each of the pixel circuits includes a signal generation circuit including a photoelectric conversion portion, a memory that holds a signal output from the signal generation circuit, and a sequential circuit including a first input node to which the signal from the memory is input, a second input node to which a control signal from the control circuit is input, a third input node, and an output node. The pixel circuits include first and second pixel circuits arranged in the same row or the same column, and the output node of the sequential circuit of the first pixel circuit is connected to the third input node of the sequential circuit of the second pixel circuit.

23 Claims, 18 Drawing Sheets

(51) Int. Cl.
  *H04N 25/767* (2023.01)
  *H04N 25/77* (2023.01)
  *H04N 25/773* (2023.01)
  *H10F 30/225* (2025.01)

(56) References Cited

U.S. PATENT DOCUMENTS

| | | | |
|---|---|---|---|
| 2021/0125029 A1* | 4/2021 | Young et al. | .......... H04N 25/40 |
| 2022/0115366 A1 | 4/2022 | Ota | |
| 2023/0215884 A1 | 7/2023 | Sekine | |
| 2023/0215893 A1 | 7/2023 | Sekine | |
| 2023/0215898 A1 | 7/2023 | Sekine | |
| 2023/0215899 A1 | 7/2023 | Sekine | |
| 2025/0080878 A1* | 3/2025 | Maehashi | ............ H04N 25/767 |

FOREIGN PATENT DOCUMENTS

| | | |
|---|---|---|
| JP | 2011-182095 A | 9/2011 |
| JP | 2012-70170 A | 4/2012 |
| JP | 2016-163156 A | 9/2016 |
| JP | 2018-186478 A | 11/2018 |
| JP | 2021-158483 A | 10/2021 |

OTHER PUBLICATIONS

U.S. Appl. No. 18/768,967, filed Jul. 10, 2024 by Yu Maehashi.
U.S. Appl. No. 18/814,829, filed Aug. 26, 2024 by Tomoya Sasago.
U.S. Appl. No. 18/819,120, filed Aug. 29, 2024 by Hiroshi Sekine.
U.S. Appl. No. 18/822,626, filed Sep. 3, 2024 by Hiroshi Sekine.
U.S. Appl. No. 18/882,053, filed Sep. 11, 2024 by Hiroshi Sekine.
U.S. Appl. No. 18/886,545, filed Sep. 16, 2024 by Yasuharu Ota.
U.S. Appl. No. 18/894,446, filed Sep. 24, 2024 by Yasuharu Ota.
U.S. Appl. No. 18/894,465, filed Sep. 24, 2024 by Hiroshi Sekine.
U.S. Appl. No. 18/901,443, filed Sep. 30, 2024 by Ayman Tarek Abdelghafar.

* cited by examiner

Figure 12:
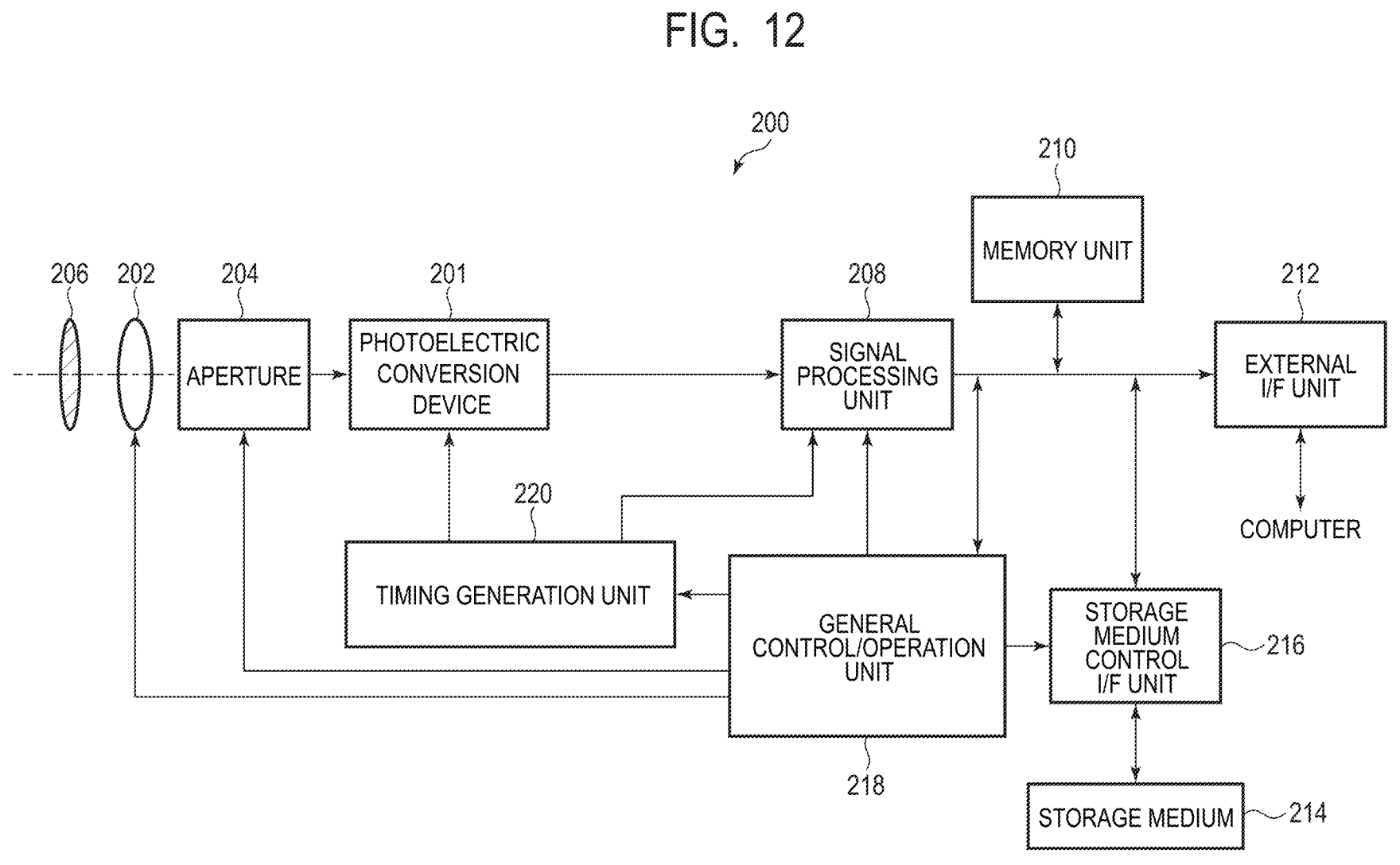

212 EXTERNAL I/F UNIT

COMPUTER

210 MEMORY UNIT

216 STORAGE MEDIUM CONTROL I/F UNIT

214 STORAGE MEDIUM

208 SIGNAL PROCESSING UNIT

218 GENERAL CONTROL/OPERATION UNIT

201 PHOTOELECTRIC CONVERSION DEVICE

220 TIMING GENERATION UNIT

204 APERTURE

Figure 13:
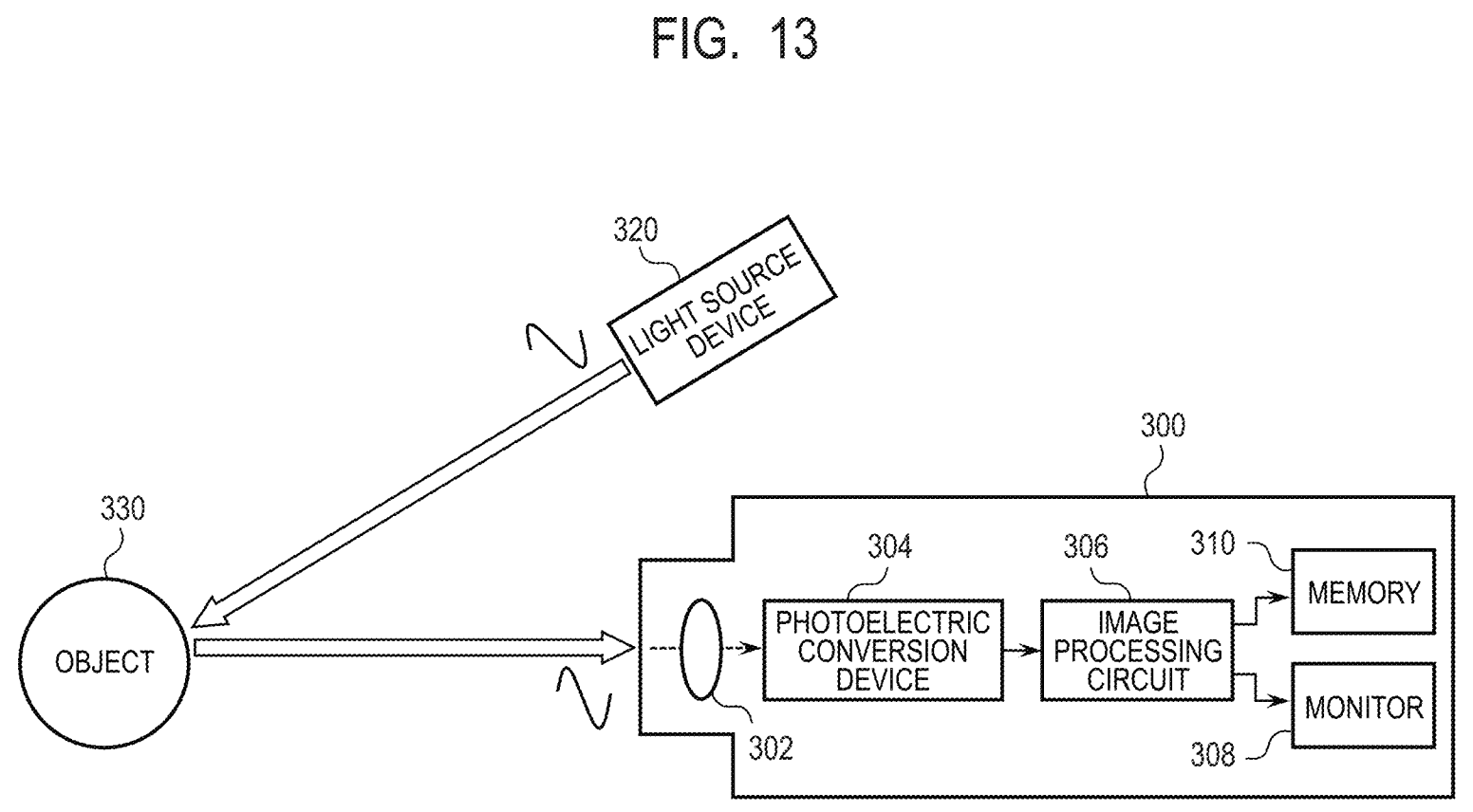

310 MEMORY

308 MONITOR

306 IMAGE PROCESSING CIRCUIT

304 PHOTOELECTRIC CONVERSION DEVICE

302

320 LIGHT SOURCE DEVICE

330 OBJECT

PHOTOELECTRIC CONVERSION DEVICE AND METHOD OF DRIVING PHOTOELECTRIC CONVERSION DEVICE

BACKGROUND

Technical Field

The present invention relates to a photoelectric conversion device and a method of driving a photoelectric conversion device.

Description of the Related Art

In recent years, performance improvements such as an increase in the number of pixels and an increase in readout speed have been attempted in an image sensor, a ranging system, and the like, and some proposals have been made regarding a readout method of pixel information corresponding to an increase in the amount of information possessed by the entire pixel. Japanese Patent Application Laid-Open No. 2012-070170 and Japanese Patent Application Laid-Open No. 2018-186478 disclose an image capturing device in which image information of a light receiving unit is transferred to an image processing unit via another light receiving unit, thereby reducing the lengths of the interconnections connected to the plurality of light receiving units.

However, in the technique described in Japanese Patent Application Laid-Open No. 2012-070170, when there is a plurality of pixel rows, it is necessary to sequentially process the pixel signals outside the pixel circuits, and it takes time to read out the signals from all the pixels. In addition, in the technique described in Japanese Patent Application Laid-Open No. 2018-186478, a readout circuit outside the pixel provided for each pixel column is responsible for processing the signals of the corresponding pixel column, and there is essentially the same problem as Japanese Patent Application Laid-Open No. 2012-070170.

SUMMARY

An object of the present invention is to provide a photoelectric conversion device and a method of driving method the same capable of reducing a time required to read out pixel signals.

According to one disclosure of the present specification, there is provided a photoelectric conversion device including a plurality of pixel circuits arranged to form a plurality of rows and a plurality of columns, and a control circuit configured to drive the plurality of pixel circuits, wherein each of the plurality of pixel circuits includes a signal generation circuit including a photoelectric conversion unit, a memory configured to hold a signal output from the signal generation circuit, and a sequential circuit including a first input node to which a signal from the memory is input, a second input node to which a control signal from the control circuit is input, a third input node, and an output node, and wherein the plurality of pixel circuits includes a first pixel circuit and a second pixel circuit arranged in the same row or the same column, and the output node of the sequential circuit of the first pixel circuit is connected to the third input node of the sequential circuit of the second pixel circuit.

According to another disclosure of the present specification, there is provided a photoelectric conversion device including a plurality of pixel circuits arranged to form a plurality of rows and a plurality of columns, and a control circuit configured to drive the plurality of pixel circuits, wherein each of the plurality of pixel circuits includes a signal generation circuit including a photoelectric conversion unit, a memory configured to hold a signal output from the signal generation circuit, and a sequential circuit to which the signal is transferred from the memory, wherein the plurality of pixel circuits includes a first group and a second group each including two or more of the pixel circuits arranged in the same row, wherein the sequential circuits of the pixel circuits constituting each of the first group and the second group are connected in series along a row direction, and are configured to sequentially transfer the signals held by the respective pixel circuits from one side to the other side along the row direction in accordance with a control signal from the control circuit, and wherein the control circuit is configured to perform a signal transfer operation in the pixel circuits of the first group and a signal transfer operation in the pixel circuits of the second group in parallel by supplying a common control signal to the pixel circuits of the first group and the pixel circuits of the second group.

According to still another disclosure of the present specification, there is provided a signal output device including a plurality of signal holding circuits arranged to form a plurality of rows and a plurality of columns, and a control circuit configured to drive the plurality of signal holding circuits, wherein each of the plurality of signal holding circuits includes a memory configured to hold a predetermined signal, and a sequential circuit to which the signal is transferred from the memory, wherein the plurality of signal holding circuits includes a first group and a second group each including two or more of the signal holding circuits arranged in the same row, wherein the sequential circuits of the signal holding circuits constituting each of the first group and the second group are connected in series along a row direction, and are configured to sequentially transfer the signals held by the respective signal holding circuits from one side to the other side along the row direction in accordance with a control signal from the control circuit, and wherein the control circuit is configured to perform a signal transfer operation in the signal holding circuits of the first group and a signal transfer operation in the signal holding circuits of the second group in parallel by supplying a common control signal to the signal holding circuits of the first group and the signal holding circuits of the second group.

According to still another disclosure of the present specification, there is provided a method of driving a photoelectric conversion device including a plurality of pixel circuits arranged to form a plurality of rows and a plurality of columns, wherein each of the plurality of pixel circuits includes a signal generation circuit including a photoelectric conversion unit, a memory configured to hold a signal output from the signal generation circuit, and a sequential circuit to which the signal is transferred from the memory, wherein the plurality of pixel circuits includes a first group and a second group each including two or more of the pixel circuits arranged in the same row, and wherein the sequential circuits of the pixel circuits constituting each of the first group and the second group are connected in series along a row direction, the method including holding a signal based on charge generated in the photoelectric conversion unit by an incidence of light in the memory in each of the plurality of pixel circuits, transferring the signal held in the memory to the sequential circuit in each of the plurality of pixel circuits, and sequentially transferring the signals held by the sequential circuits of the pixel circuits constituting each of the first group and the second group from one side to the other side along the row direction, wherein in the sequentially transferring, a signal transfer operation in the pixel circuits of the first group and a signal transfer operation in the pixel circuits of the second group are performed in parallel by supplying a common control signal to the pixel circuits of the first group and the pixel circuits of the second group.

Further features of the present invention will become apparent from the following description of exemplary embodiments with reference to the attached drawings.

BRIEF DESCRIPTION OF THE DRAWINGS

FIG. 3, FIG. 4, FIG. 5, and FIG. 6 are block diagrams illustrating a configuration example of a clock buffer circuit in the signal output device according to the first embodiment of the present invention.

FIG. 10 is a circuit diagram illustrating another configuration example of the signal output device according to the third embodiment of the present invention.

FIG. 12 is a block diagram illustrating a schematic configuration of a photodetection system according to a fifth embodiment of the present invention.

FIG. 13 is a block diagram illustrating a schematic configuration of a range image sensor according to a sixth embodiment of the present invention.

DESCRIPTION OF THE EMBODIMENTS

Preferred embodiments of the present disclosure will now be described in detail in accordance with the accompanying drawings.

First Embodiment

A signal output device and a method of driving the same according to a first embodiment of the present invention will

Figure 1:
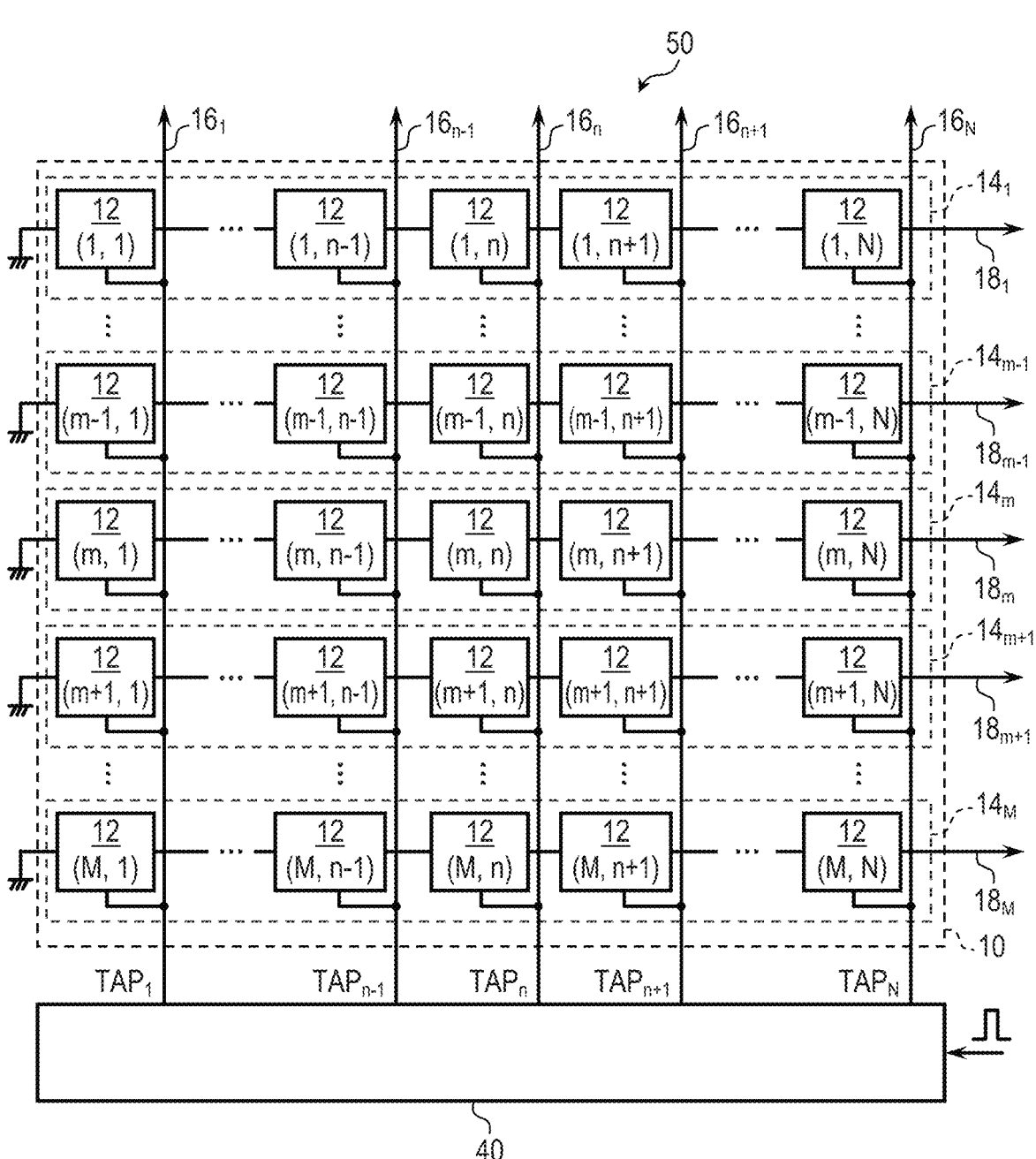
FIG. 1 is a block diagram illustrating a schematic configuration of a signal output device according to a first embodiment of the present invention.
Figure 2:
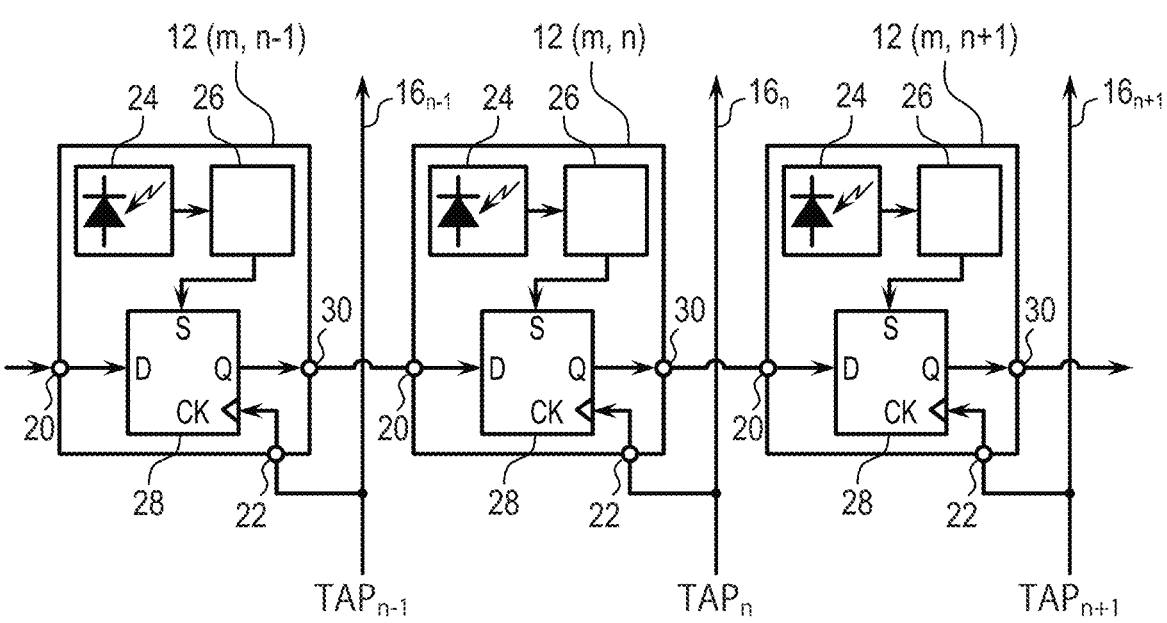
FIG. 2 is a block diagram illustrating a configuration example of a signal holding circuit in the signal output device according to the first embodiment of the present invention.
Figure 7:
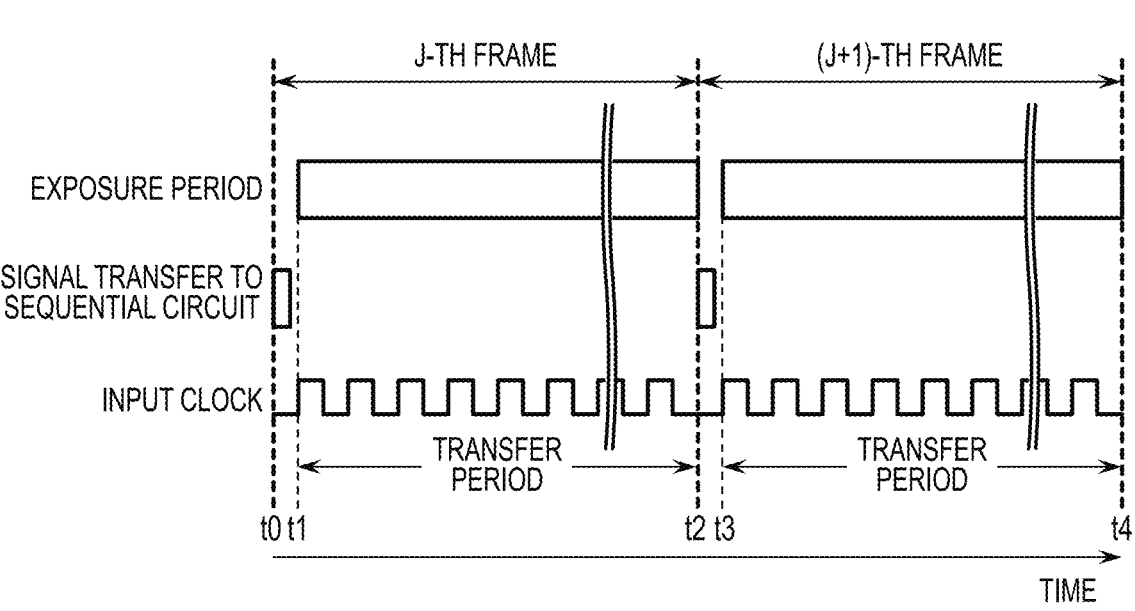
FIG. 7 is a timing chart illustrating a method of driving the signal output device according to the first embodiment of the present invention.

4 be described with reference to FIG. 1 to FIG. 7. FIG. 1 is a block diagram illustrating a schematic configuration of a signal output device according to the present embodiment. FIG. 2 is a block diagram illustrating a configuration example of a signal holding circuit in the signal output device according to the present embodiment. FIG. 3 to FIG. 6 are circuit diagrams illustrating configuration examples of the clock buffer circuit in the signal output device according to the present embodiment. FIG. 7 is a timing chart illustrating a method of driving the signal output device according to the present embodiment.

First, a schematic configuration of the signal output device according to the present embodiment will be described with reference to FIG. 1. As illustrated in FIG. 1, the signal output device 50 according to the present embodiment includes a signal holding region 10 and a clock buffer circuit 40.

The signal holding region 10 is provided with a plurality of signal holding circuits 12 arranged in a matrix so as to form a plurality of rows and a plurality of columns. In FIG. 1, it is assumed that the signal holding region 10 is constituted by a plurality of signal holding circuits 12 arranged in a matrix of (M-number of rows)×(N-number of columns). Each of the plurality of signal holding circuits 12 is provided with coordinates corresponding to a row number and a column number. For example, the block of the signal holding circuit 12 arranged in the m-th row and the n-th column is denoted by coordinates (m, n) in addition to the reference numeral 12. Here, m is an integer of 1 to M, and n is an integer of 1 to N.

The number of signal holding circuits 12 constituting the signal holding region 10 is not particularly limited as long as M is an integer of 1 or more and N is an integer of 2 or more. Note that a row and a column may be arbitrarily defined, and the row described in the present embodiment may be a column and the column described in the present embodiment may be a row.

The N-number of signal holding circuits 12 arranged in each row of the signal holding region 10 constitute a signal holding circuit group 14. In FIG. 1, corresponding row numbers are attached to the reference numerals of the signal holding circuit groups 14 of the respective rows. For example, the signal holding circuit group 14 arranged in the m-th row is denoted by reference numeral $14_m$. The N-number of signal holding circuits 12 constituting one signal holding circuit group 14 are connected in series. For example, when the signal holding circuit group $14_m$ is described as an example, an input node of the signal holding circuit 12(m, 1) is connected to a ground voltage node, and an output node of the signal holding circuit 12(m, 1) is connected to an input node of the signal holding circuit 12(m, 2) (not illustrated). An input node of the signal holding circuit 12(m, n) is connected to an output node of the signal holding circuit 12(m, n−1), and an output node of the signal holding circuit 12(m, n) is connected to an input node of the signal holding circuit 12(m, n+1). An input node of the signal holding circuit 12(m, N) is connected to an output node of the signal holding circuit 12(m, N−1) (not illustrated), and an output node of the signal holding circuit 12(m, N) is connected to an output line $18_m$.

A signal line 16 is arranged in each column of the signal holding region 10. In FIG. 1, the reference numerals of the signal lines 16 of the respective columns are assigned corresponding column numbers. For example, the signal line 16 arranged in the n-th column is denoted by reference numeral $16_n$. Each of the signal lines 16 is connected to the signal holding circuits 12 arranged in the corresponding column. For example, the signal line $16_n$ is connected to the signal holding circuits 12(1, n), . . . , 12(m−1, n), 12(m, n), 12 (m+1, n), . . . , 12(M, n) arranged in the n-th column. The signal lines 16 are connected to the clock buffer circuit 40.

The clock buffer circuit 40 serves as a control circuit for driving the signal holding circuits 12. The clock buffer circuit 40 has one input node to which a clock signal is input, and the number of output nodes TAP corresponding to each column of the signal holding region 10. In FIG. 1, the reference numerals of the output nodes TAP of the respective columns are assigned corresponding column numbers. For example, the output node TAP arranged in the n-th column is denoted by reference numeral $TAP_n$. A clock signal that is input to the clock buffer circuit 40 and processed by the internal circuit thereof is output from each of the output nodes TAP.

Although one clock buffer circuit 40 is provided for the M-number of signal holding circuit groups $14_1$ to $14_M$ in FIG. 1, the clock buffer circuit 40 may be provided in units of arbitrary rows. For example, M-number of clock buffer circuits 40 corresponding to each of the plurality of signal holding circuit groups $14_1$ to $14_M$ may be provided, or one clock buffer circuit 40 may be provided for every arbitrary number of two or more signal holding circuit groups 14. Reducing the number of clock buffer circuits 40 has an advantage of improving the power efficiency of the entire device.

Next, a configuration example of the signal holding circuit 12 will be described with reference to FIG. 2. FIG. 2 illustrates three signal holding circuits 12(m, n−1), 12(m, n), and 12(m, n+1) of the signal holding circuit group $14_m$ arranged in adjacent columns among the plurality of signal holding circuits 12 constituting the signal holding region 10. An internal circuit configuration and connection relationships of the other signal holding circuits 12 are similar to those of the signal holding circuits 12 illustrated in FIG. 2. Although the circuit constituting the signal holding circuit 12 is not particularly limited as long as it has a function of holding a signal, a pixel circuit of a photoelectric conversion device will be described as an example here.

As illustrated in, e.g., FIG. 2, the signal holding circuit 12 may include a signal generation circuit 24, a memory 26, and a sequential circuit 28. The signal generation circuit 24 is connected to the memory 26. The memory 26 is connected to the sequential circuit 28. The signal generation circuit 24 includes a photoelectric conversion element, generates a signal according to incident light on the photoelectric conversion element, and outputs the generated signal to the memory 26. The memory 26 holds the signal input from the signal generation circuit 24, and outputs the held signal to the sequential circuit 28 in accordance with an external control signal. The sequential circuit 28 is a circuit whose output state is determined by a combination of an external input signal and a held internal state, and may be configured by, for example, a D-type flip-flop having a set terminal.

The D-type flip-flop having the set terminal includes two input terminals (a D-terminal and an S-terminal), one clock input terminal (a CK-terminal), and one output terminal (a Q-terminal). When a signal is input to the S-terminal, data output from the Q-terminal of the sequential circuit 28 is at the level of the signal input to the S-terminal regardless of the clock signal input to the CK-terminal. When a signal is input to the D-terminal, the data output from the Q-terminal of the sequential circuit 28 becomes the level of the signal input to the D-terminal in synchronization with the level transition of the clock signal input to the CK-terminal. The clock signal input to the CK-terminal may also be referred to as a control signal of the sequential circuit 28.

Note that a D-type flip-flop in which the level of the signal output from the Q-terminal changes in accordance with the timing of the rising edge of the clock signal (positive edge) is referred to as a positive edge triggered D-type flip-flop. A D-type flip-flop in which the level of the signal output from the Q-terminal changes in accordance with the timing of the falling edge of the clock signal (negative edge) is referred to as a negative edge triggered D-type flip-flop. Although the sequential circuit 28 may be configured by either D-type flip-flop, it is assumed here that the sequential circuit 28 is configured by a positive edge triggered D-type flip-flop.

The S-terminal of the sequential circuit 28 is connected to the output node of the memory 26. The D-terminal of the sequential circuit 28 is connected to the input node 20 of the signal holding circuit 12. The CK-terminal of the sequential circuit 28 is connected to the input node 22 of the signal holding circuit 12. The Q-terminal of the sequential circuit is connected to the output node 30 of the signal holding circuit 12.

The N-number of signal holding circuits 12 arranged in the same row and constituting one signal holding circuit group 14 are connected in series as described above. For example, the input node 20 of the signal holding circuit 12(m, n) is connected to the output node 30 of the signal holding circuit 12(m, n−1), and the output node 30 of the signal holding circuit 12(m, n) is connected to the input node 20 of the signal holding circuit 12(m, n+1). The signal line 16 arranged in the corresponding column is connected to the input node 22 of the signal holding circuit 12. For example, the input node 22 of the signal holding circuit 12(m, n) is connected to the signal line $16_n$ connected to the output node $TAP_n$ of the clock buffer circuit 40. Thus, the serial connection body of the sequential circuits 28 included in the signal holding circuits 12 of each column of the one signal holding circuit group 14 constitutes a shift register.

It can also be said that the signal holding circuit group 14 in each row has one input node and one output node as a whole. For example, the input node 20 of the signal holding circuit 12(m, 1) may be an input node of the signal holding circuit group $14_m$, and the output node 30 of the signal holding circuit 12(m, N) may be an output node of the signal holding circuit group $14_m$. Although the input node 20 of the signal holding circuit 12(m, 1) is connected to the ground voltage node in FIG. 1, an arbitrary logic signal may be input from the input node 20 of the signal holding circuit 12(m, 1).

Next, a configuration example of the clock buffer circuit 40 will be described with reference to FIG. 3 to FIG. 6.

As described above, the clock buffer circuit 40 includes one input node CIN and N-number of output nodes $TAP_1$ to $TAP_N$ corresponding to the number of columns constituting the signal holding region 10. A clock signal is input to the input node CIN, and clock signals formed by an internal circuit are output from the output nodes $TAP_1$ to $TAP_N$. As illustrated in FIG. 3 to FIG. 6, the clock buffer circuit 40 may include a plurality of buffer circuits 42 or a plurality of inverting buffer circuits 46. The clock buffer circuit 40 may be configured by a buffer structure such as a tree type, a repeater type, or the like, it is assumed here that the clock buffer circuit has a tree type buffer structure.

Figure 3:
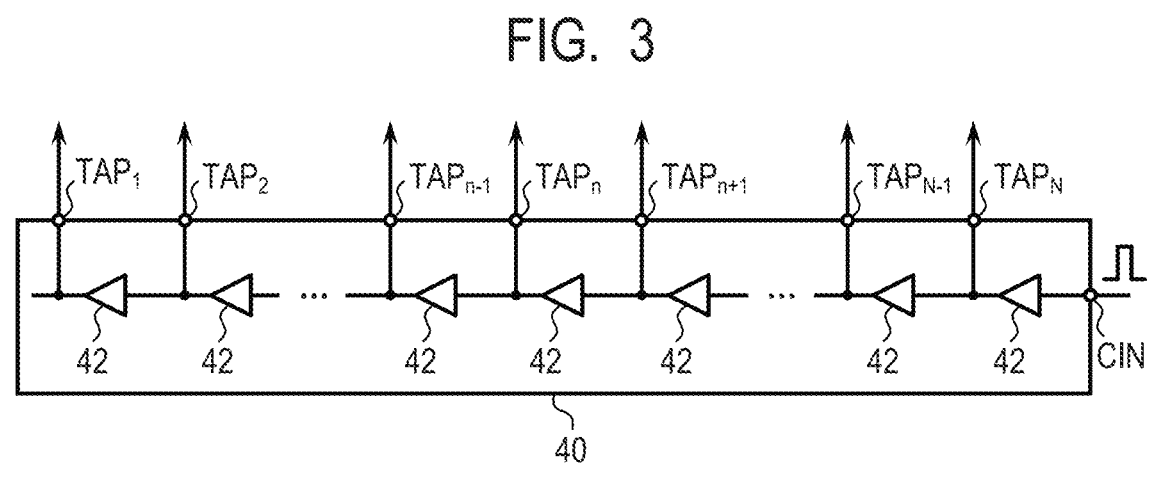

In the clock buffer circuit 40 illustrated in FIG. 3, N-number of buffer circuits 42 corresponding to the number of columns constituting the signal holding region 10 are connected in series. The output nodes of the N-number of buffer circuits 42 become the output nodes $TAP_N$, $TAP_{N-1}$, . . . , $TAP_{n+1}$, $TAP_n$, $TAP_{n-1}$, . . . , $TAP_2$, and $TAP_1$ of the clock buffer circuit 40 in order from the side close to the input node CIN.

Figure 4:
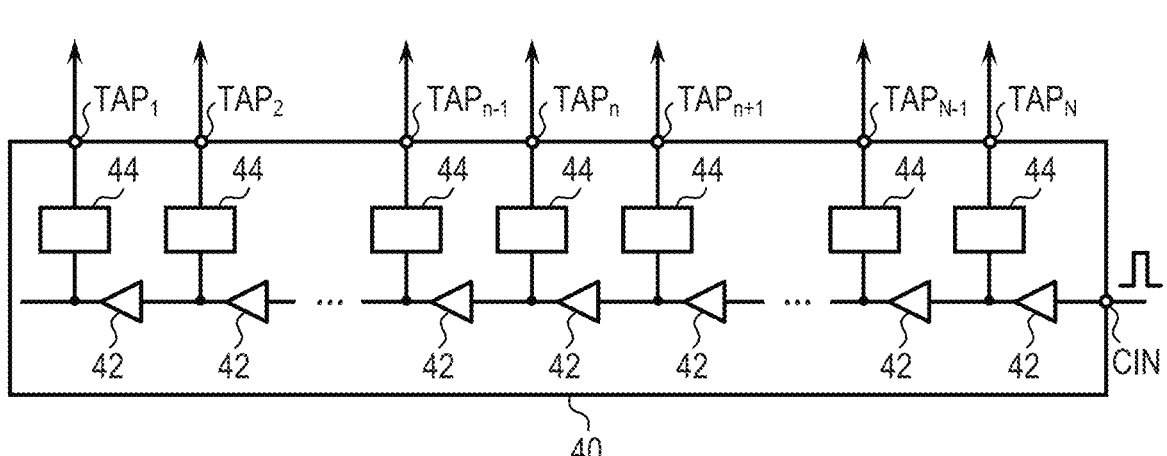

The clock buffer circuit 40 illustrated in FIG. 4 is a configuration example in which a logic circuit 44 is connected between the output node TAP and the output node of the buffer circuit 42 of each column. Here, the logic circuit 44 is a circuit such as a buffer, an inverter, or the like for improving bluntness of a voltage waveform. That is, by providing the logic circuit 44, the dependency relationship between the voltage waveforms of the output nodes $TAP_1$ to $TAP_N$ and the output impedance of the buffer circuits 42 may be reduced, and the degree of freedom in circuit design may be improved.

Figure 5:
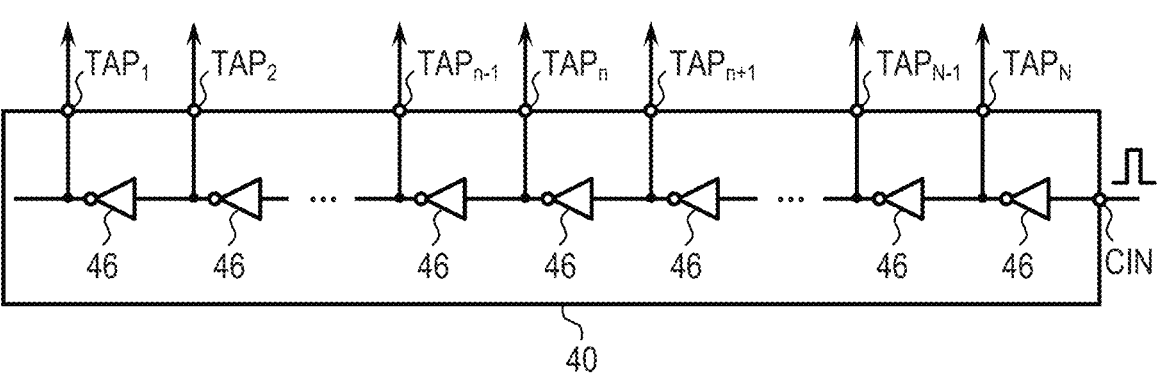

In the clock buffer circuit 40 illustrated in FIG. 5, the buffer circuits 42 are replaced with inverting buffer circuits 46. The clock buffer circuit 40 is not necessarily configured by a non-inverting buffer circuit and may be configured by an inverting buffer circuit. The inverting buffer circuit 46 may be applied to the configuration example of FIG. 4.

Figure 6:
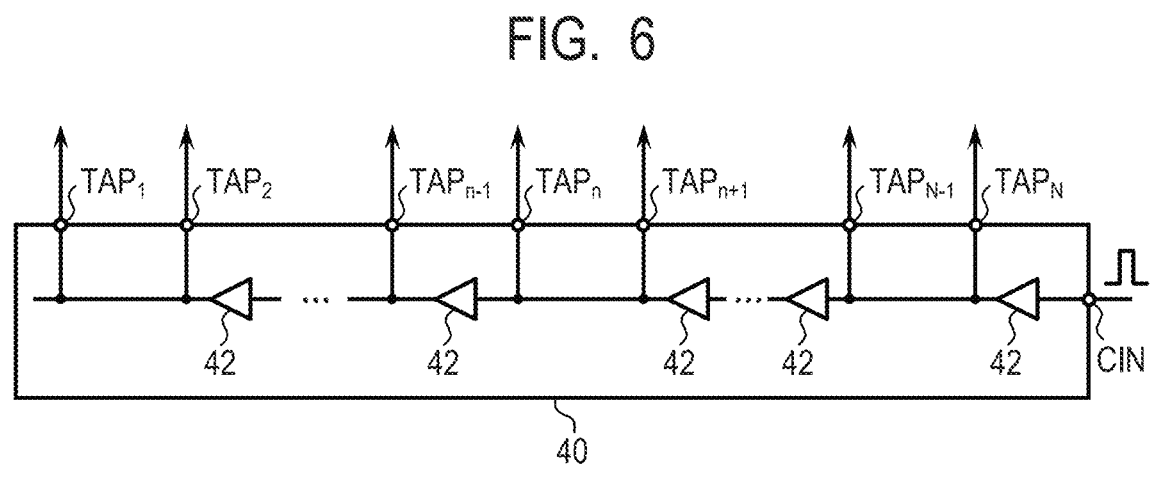

The clock buffer circuit 40 illustrated in FIG. 6 includes (N/2)-number of buffer circuits 42 connected in series, where N is the number of columns constituting the signal holding region 10. Two output nodes TAP of the clock buffer circuit 40 are connected to the output nodes of each of the (N/2)-number of buffer circuits 42. For example, an output node of the buffer circuit 42 disposed at a position closest to the input node CIN is connected to the output nodes $TAP_N$ and $TAP_{N-1}$. The (N/2)-th output node of the buffer circuit 42 from the input node CIN is connected to the output nodes $TAP_2$ and $TAP_1$. Clock pulses are output from two output nodes TAP connected to the output node of the same buffer circuit 42 at the same timing. Although an example in which two output nodes TAP are connected to the output node of the same buffer circuit 42 is described here, three or more output nodes TAP may be connected to the output node of the same buffer circuit 42.

This configuration may be also applied to the configuration example of FIG. 4 or FIG. 5.

Although the input node CIN of the clock buffer circuit 40 may be provided on the first column side of the signal holding circuit group 14, it is more preferable to provide it on the N-th column side of the signal holding circuit group 14 as illustrated in FIG. 3 to FIG. 6 from the viewpoint of timing design controllability. In this case, for example, the number of buffer circuits 42 through which the clock signal supplied to the sequential circuit 28 of the signal holding circuit 12 of the (n−1)-th column passes is larger than the number of buffer circuits 42 through which the clock signal supplied to the sequential circuit 28 of the signal holding circuit 12 of the n-th column passes.

Next, the operation of the signal output device according to the present embodiment will be described with reference to FIG. 7. FIG. 7 schematically illustrates the operation of the signal output device in the J-th frame and the (J+1)-th frame. The period from time to t0 time t2 is the J-th frame period, and the period from time t2 to time t4 is the (J+1)-th frame period.

The period from time t1 to time t2 is the exposure period of the J-th frame. When light enters the signal holding region 10 during the exposure period, the signal generation circuit 24 of each signal holding circuit 12 generates a logic signal of logic H or logic L according to the incident light, and outputs the generated logic signal to the memory 26. The logic signal output from the signal generation circuit 24 is stored in the memory 26. The logic signal stored in the memory 26 during the exposure period of the J-th frame is read out during the next (J+1)-th frame period.

After the logic signal of the signal generation circuit 24 of each signal holding circuit 12 is determined at time t2, the memory 26 of each signal holding circuit 12 outputs the held logic signal to the S-terminal of the sequential circuit 28 in accordance with a control signal from a control circuit (not illustrated). As a result, the logic signal transferred from the memory 26 is held in the sequential circuit 28 as its output.

In a period from time t3 to time t4 after the transfer of the logic signal from the memory 26 to the sequential circuit 28 in each signal holding circuit 12 is completed, the control circuit (not illustrated) inputs a predetermined number or more of clock pulses from the input node CIN of the clock buffer circuit 40. As a result, a clock pulse is output from each output node TAP of the clock buffer circuit 40 at a predetermined timing corresponding to the input timing of the clock pulse to the input node CIN and the number of buffer circuits 42 up to each output node TAP. The number of clock pulses input to the clock buffer circuit 40 (the predetermined number or more of clock pulses described above) may be equal to or greater than (N−1), where N is the number of signal holding circuits 12 (the number of columns) included in the signal holding circuit group 14.

The sequential circuit 28 of the signal holding circuit 12 of each column constituting the signal holding circuit group 14 is driven by a clock pulse output from the corresponding output node TAP of the clock buffer circuit 40. The sequential circuit 28 sends the logic signal set every time the clock pulse is received to the subsequent sequential circuit 28. For example, the logic signal set in the sequential circuit 28 of the signal holding circuit 12($m$, $n$) is set in the sequential circuit 28 of the subsequent signal holding circuit 12($m$, $n$+1) in response to an input of the clock pulse to the signal holding circuit 12($m$,$n$). Further, the logic signal set in the sequential circuit 28 of the signal holding circuit 12($m$, $n$−1) is set in the sequential circuit 28 of the signal holding circuit 12($m$, $n$) of the subsequent stage in response to an input of the clock pulse to the signal holding circuit 12($m$, $n$−1). As a result, the logic signals held in the signal holding circuits 12 of the respective columns are sequentially transferred to the output line 18 side, and the number of logic signals corresponding to the number of clock pulses input to the clock buffer circuit 40 is output as a bit stream to the output line 18 of the signal holding circuit group 14.

In this way, by inputting the number of clock pulses corresponding to the number of signal holding circuits 12 constituting each signal holding circuit group 14, the bit streams of the signal holding circuit groups 14 in all rows may be output. That is, data of all the signal holding circuits 12 constituting the signal holding region 10 may be read out and output to a device at a subsequent stage (not illustrated). For example, in a case where the signal holding region 10 is configured by the signal holding circuits 12 arranged in a matrix of (1000 rows)×(1000 columns), 1M-bit information held in the signal holding region 10 may be read out by inputting the clock pulse 999 times, and a readout time may be shortened.

The phases of the clock pulses output from the output nodes $TAP_1$ to $TAP_N$ are different from each other, and the timing at which the sequential circuit 28 of the signal holding circuit 12 of each column sends the logic signal to the subsequent stage is also different from each other in time. For example, the phase of the clock pulse output from the output node $TAP_n$ is delayed from the phase of the clock pulse output from the output node $TAP_N$. As a result, the driving timing of the sequential circuit 28 of the signal holding circuit 12 in the n-th column becomes later than the driving timing of the sequential circuit 28 of the signal holding circuit 12 in the N-th column. Therefore, the power bounce generated by the readout operation of the logic signals from the signal holding region 10 is a superposition of small voltage peaks having different phases over the entire readout time. Since the intensity of the power bounce is temporally diffused, it is possible to reduce a hindrance to the speeding up of the readout operation.

Further, when the input node CIN of the clock buffer circuit 40 is on the N-th column side of the signal holding region 10, it is easy to control the timing of the phase of the clock signal input by the control circuit (not illustrated) and the phase of the bit stream output from the signal holding circuit group 14. The ability to relax the constraints on the timing in terms of design is an advantage for speeding up the readout operation.

The transfer period in which the transfer operation for outputting the logic signal acquired during the exposure period of the J-th frame is performed may be performed in parallel with the exposure period of the next frame ((J+1)-th frame). This makes it possible to further increase the readout speed.

As described above, according to the present embodiment, in a photoelectric conversion device including a plurality of pixel circuits, it is possible to reduce the time required to read out pixel signals.

Second Embodiment

Figure 8:
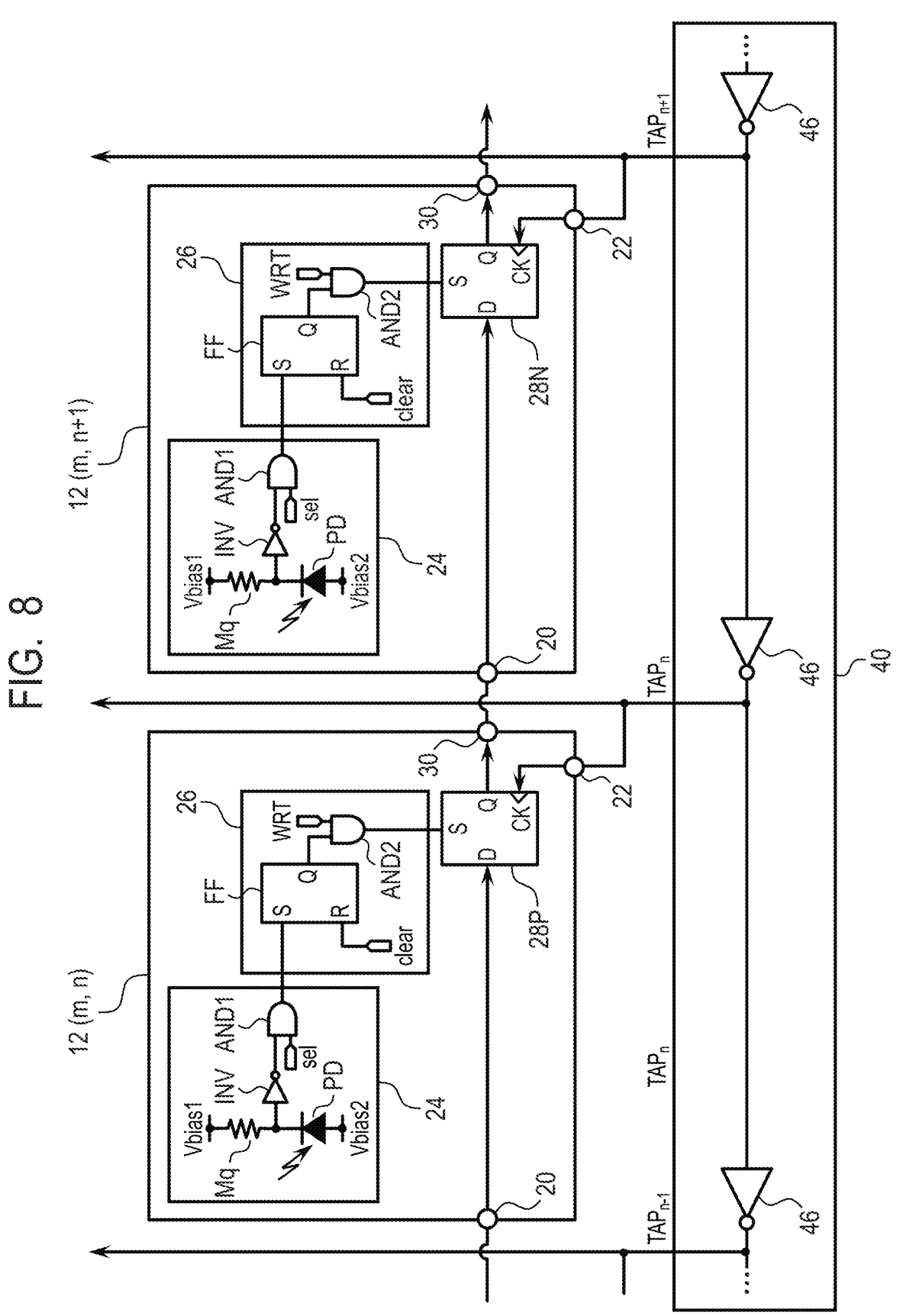
FIG. 8 is a circuit diagram illustrating a schematic configuration of a signal output device according to a second embodiment of the present invention.

A signal output device and a method of driving the same according to a second embodiment of the present invention will be described with reference to FIG. 8. The same components as those of the signal output device according to the first embodiment are denoted by the same reference numerals, and description thereof will be omitted or simplified. FIG. 8 is a circuit diagram illustrating a schematic configuration of a signal output device according to the present embodiment.

A schematic configuration of the signal output device according to the present embodiment will be described with reference to FIG. 8. FIG. 8 illustrates a corresponding portion of the clock buffer circuit 40 and two signal holding circuits 12(m, n) and 12(m, n+1) arranged in adjacent columns of the signal holding circuit group 14_m among the signal holding circuits 12 constituting the signal holding region 10.

In the signal output device according to the present embodiment, the configuration of the sequential circuit 28 in the signal holding circuits 12 arranged in adjacent columns of the same row is different. Specifically, one of the two adjacent signal holding circuits 12 is configured by using a positive edge triggered D-type flip-flop (sequence circuit 28P), and the other is configured by using a negative edge triggered D-type flip-flop (sequence circuit 28N). For example, in the case where the signal holding circuit 12(m, n) is configured by the positive edge triggered sequence circuit 28P, the signal holding circuit 12(m, n−1) and the signal holding circuit 12(m, n+1) are configured by the negative edge triggered sequence circuit 28N. The clock buffer circuit 40 is configured by the inverting buffer circuits 46 in order to adapt to clock driving suitable for the operations of the sequential circuits 28P and 28N.

Here, it is assumed that the signal generation circuit 24 is a SPAD (Single Photon Avalanche Diode) circuit, and outputs a logic signal of logic H when incident light is detected. As illustrated in, e.g., FIG. 8, the signal generation circuit 24 may include an avalanche photodiode PD, a quenching element Mq, a waveform shaping circuit INV, and a logic circuit AND1.

A voltage Vbias1 is supplied to a cathode of the avalanche photodiode PD via the quenching element Mq, and a voltage Vbias2 is supplied to an anode of the avalanche photodiode PD. An input node of the waveform shaping circuit INV is connected to a connection node between the cathode of the avalanche photodiode PD and the quenching element Mq. An output node of the waveform shaping circuit INV is connected to one input node of the logic circuit AND1, and a control signal sel is supplied to the other input node of the logic circuit AND1 from a control circuit (not illustrated). An output node of the logic circuit AND1 is the output node of the signal generation circuit 24.

When light is incident on the avalanche photodiode PD in a state where a reverse bias voltage corresponding to a potential difference between the voltage Vbias1 and the voltage Vbias2 is applied, an electron-hole pair is generated by photoelectric conversion, and an avalanche current flows using the charge as a seed. The waveform shaping circuit INV shapes a voltage change due to the avalanche current flowing through the avalanche photodiode PD into a pulse signal, and outputs a logic signal of logic H according to light incidence. The logic circuit AND1 outputs a logic signal of logic H when both the output signal of the waveform shaping circuit INV and the control signal sel are logic H.

As illustrated in, e.g., FIG. 8, the memory 26 may include an RS flip-flop circuit FF and a logic circuit AND2. The RS flip-flop circuit FF includes two input terminals (an S-terminal and an R-terminal) and one output terminal (a Q-terminal). The S-terminal of the RS flip-flop circuit FF is connected to the output node of the signal generation circuit 24, and the Q-terminal of the RS flip-flop circuit FF is connected to one input node of the logic circuit AND2. The R-terminal of the RS flip-flop circuit FF is supplied with a control signal clear from the control circuit (not illustrated), and the other input node of the logic circuit AND2 is supplied with a control signal WRT from the control circuit (not illustrated). An output node of the logic circuit AND2 is the output node of the memory 26.

The RS flip-flop circuit FF has bi-stability, and when receiving a logic signal of logic H from the signal generation circuit 24, the RS flip-flop circuit FF holds the logic signal of logic H and outputs the logic signal from the Q-terminal. When the RS flip-flop circuit FF receives a control signal clear of logic H from the control circuit (not illustrated), the RS flip-flop circuit FF resets the held logic signal. The logic circuit AND1 outputs a logic signal of logic H when both the output signal of the RS flip-flop circuit FF and the control signal WRT are logic H.

The configuration and operation of the sequential circuits 28P and 28N are as described in the first embodiment. That is, the sequential circuit 28P may be configured by a positive edge triggered D-type flip-flop circuit, and the sequential circuit 28N may be configured by a negative edge triggered D-type flip-flop circuit. In the sequential circuits 28P and 28N, when the output of the memory 26 is logic H, the output of the Q-terminal becomes logic H in response to a control signal at an appropriate timing from the control circuit (not illustrated).

Before this appropriate timing, the Q-terminals of the sequential circuits 28 of all the signal holding circuits 12 constituting the signal holding circuit group 14 must be logical L. This may be realized by inputting clock pulses equal to or more than the number of the signal holding circuits 12 constituting the signal holding circuit group 14 to the input node CIN of the clock buffer circuit 40 while fixing the input node of the signal holding circuit group 14 to logic L.

In the signal output device according to the present embodiment, the design of the clock buffer circuit 40 and the sequential circuits 28P and 28N becomes simple, and the circuit area and the power consumption may be reduced. In addition, even when the output driving power of the inverting repeat buffer of the clock buffer circuit 40 is unbalanced at the rising edge and the falling edge of the signal, the driving power unbalance is canceled during the repetitive inverting propagation. As a result, it is possible to alleviate the adverse effect that the reduction or expansion of the duty of the voltage waveform propagates to the taps on the upstream side of the signal holding circuit 12. The reduction of the area and the power consumption and the improvement of the designability of the buffer circuit are advantages for speeding up the readout operation.

As described above, according to the present embodiment, in a photoelectric conversion device including a plurality of pixel circuits, it is possible to reduce the time required to read out pixel signals.

Third Embodiment

Figure 9:
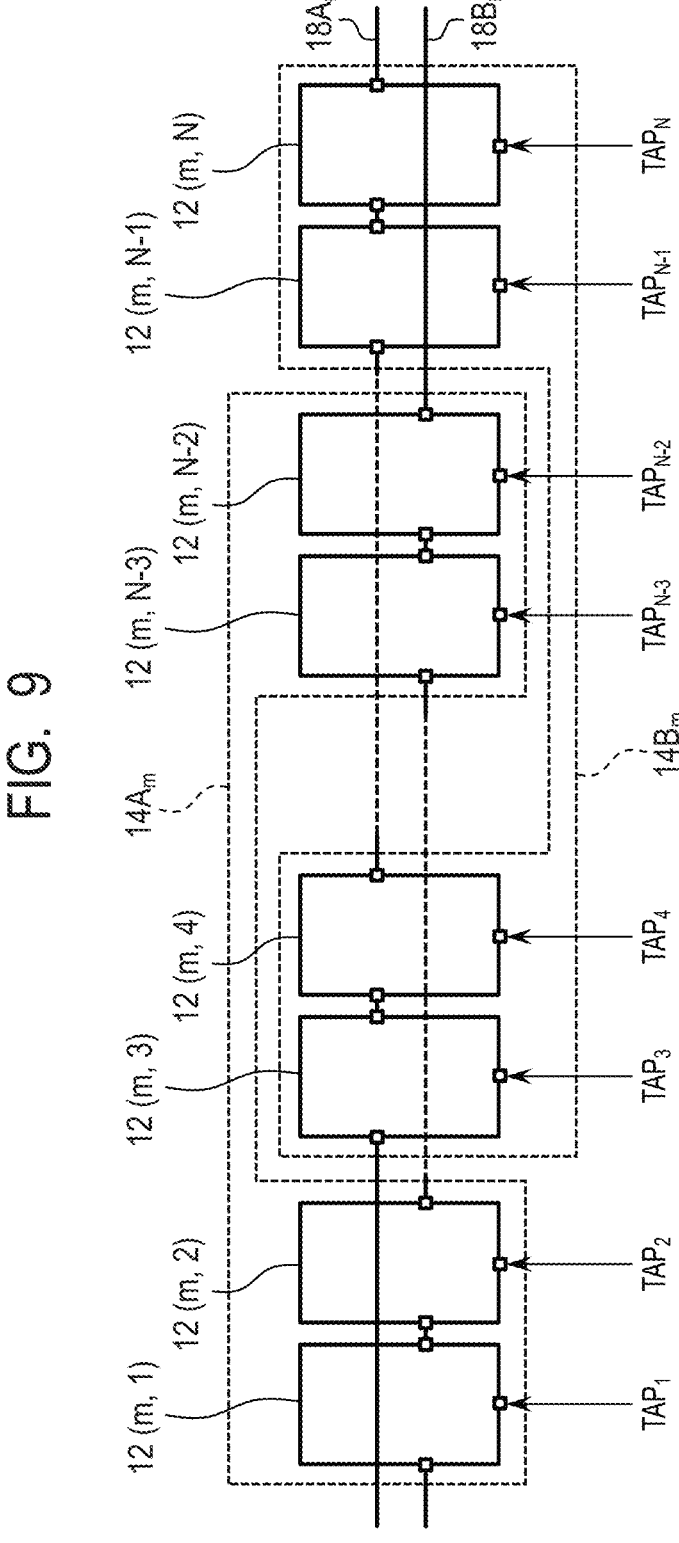
FIG. 9 is a block diagram illustrating a schematic configuration of a signal output device according to a third embodiment of the present invention.
Figure 10:
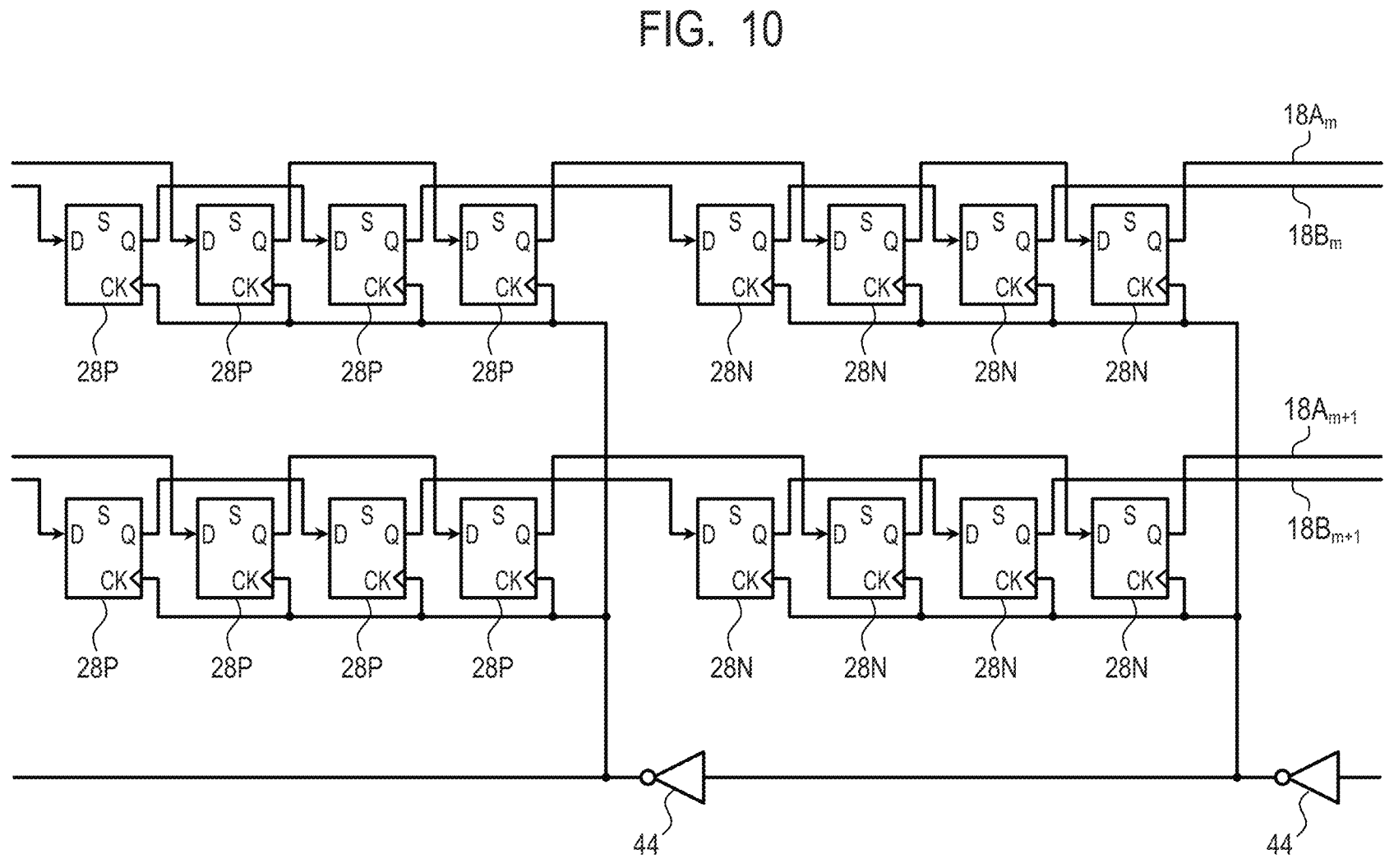

A signal output device and a method of driving the same according to a third embodiment of the present invention will be described with reference to FIG. 9 and FIG. 10. The same components as those of the signal output device according to the first or second embodiment are denoted by the same reference numerals, and description thereof will be omitted or simplified. FIG. 9 is a block diagram illustrating a schematic configuration of a signal output device according to the present embodiment. FIG. 10 is a circuit diagram illustrating a configuration example of the signal output device according to the present embodiment.

FIG. 9 illustrates a plurality of signal holding circuits 12 constituting one row among the constituent elements of the signal output device according to the present embodiment. In the present embodiment, the plurality of signal holding circuits 12 constituting one row (for example, the m-th row) are divided into two signal holding circuit groups $14A_m$ and $14B_m$. The method of distributing the signal holding circuits 12 to the two signal holding circuit groups $14A_m$ and $14B_m$ is not particularly limited, but for example, the signal holding circuits 12 may be alternately distributed to the signal holding circuit groups $14A_m$ and $14B_m$ in units of a predetermined number of columns. When the signal holding circuits 12 are alternately distributed to the signal holding circuit groups $14A_m$ and $14B_m$ every two columns, as illustrated in, e.g., FIG. 9, the signal holding circuits 12(m, 1), 12(m, 2), . . . , 12(m, N–3), and 12(m, N–2) may be distributed to the signal holding circuit group $14A_m$. In addition, the signal holding circuits 12(m, 3), 12(m, 4), . . . , 12(m, N–1), and 12(m, N) may be distributed to the signal holding circuit group $14B_m$. The allocation of the signal holding circuits 12 to the signal holding circuit groups $14A_m$ and $14B_m$ may be performed for each column or for a predetermined number of columns of three or more columns. The plurality of signal holding circuits 12 constituting one row may be divided into three or more signal holding circuit groups 14.

The output line $18_m$ arranged in each row is divided into output lines $18A_m$ and $18B_m$ corresponding to the signal holding circuit groups $14A_m$ and $14B_m$. The clock buffer circuit 40 is common to the signal holding circuit groups $14A_m$ and $14B_m$, and is configured to input the clock signal output from each output node TAP to the signal holding circuit 12 of the corresponding column, as in the first embodiment. Thus, reading out of the signals from the signal holding circuits 12 belonging to the signal holding circuit group $14A_m$ to the output line $18A_m$ and reading out of the signals from the signal holding circuits 12 belonging to the signal holding circuit group $14B_m$ to the output line $18B_m$ may be performed in parallel.

FIG. 10 illustrates a part of the sequential circuits 28 of the plurality of signal holding circuits 12 constituting two rows (m-th row and (m+1)-th row) among the components of the signal output device according to the present embodiment. In the configuration example of FIG. 10, the signal holding circuit 12 including the sequential circuit 28P and the signal holding circuit 12 including the sequential circuit 28N are alternately arranged for every four columns, and a common clock signal is input for every four columns. The plurality of signal holding circuits 12 in each row are alternately distributed to the signal holding circuit groups 14A and 14B for each column. For example, the signal holding circuits 12 arranged in odd-numbered columns belong to the signal holding circuit group 14A, and the signal holding circuits 12 arranged in even-numbered columns belong to the signal holding circuit group 14B.

In the present embodiment, the number of the signal holding circuits 12 included in each of the signal holding circuit groups 14A and 14B is half the number of the signal holding circuits 12 included in the signal holding circuit group 14 of the first or second embodiment. In addition, the reading out of the signals from the signal holding circuit group 14A and the reading out of the signals from the signal holding circuit group 14B may be performed in parallel without newly replacing the clock buffer circuit 40. Therefore, according to the present embodiment, as compared with the signal output device according to the first or second embodiment, the readout time of the signal from the signal holding circuits 12 in each row may be reduced to half. Further, in the present embodiment, the number of clock pulses required to read out signals from the plurality of signal holding circuits 12 constituting one row is also halved. As a result, the power consumption of the circuit in the signal processing may be reduced.

As described above, according to the present embodiment, in a photoelectric conversion device including a plurality of pixel circuits, it is possible to reduce the time required to read out pixel signals.

Fourth Embodiment

Figure 11:
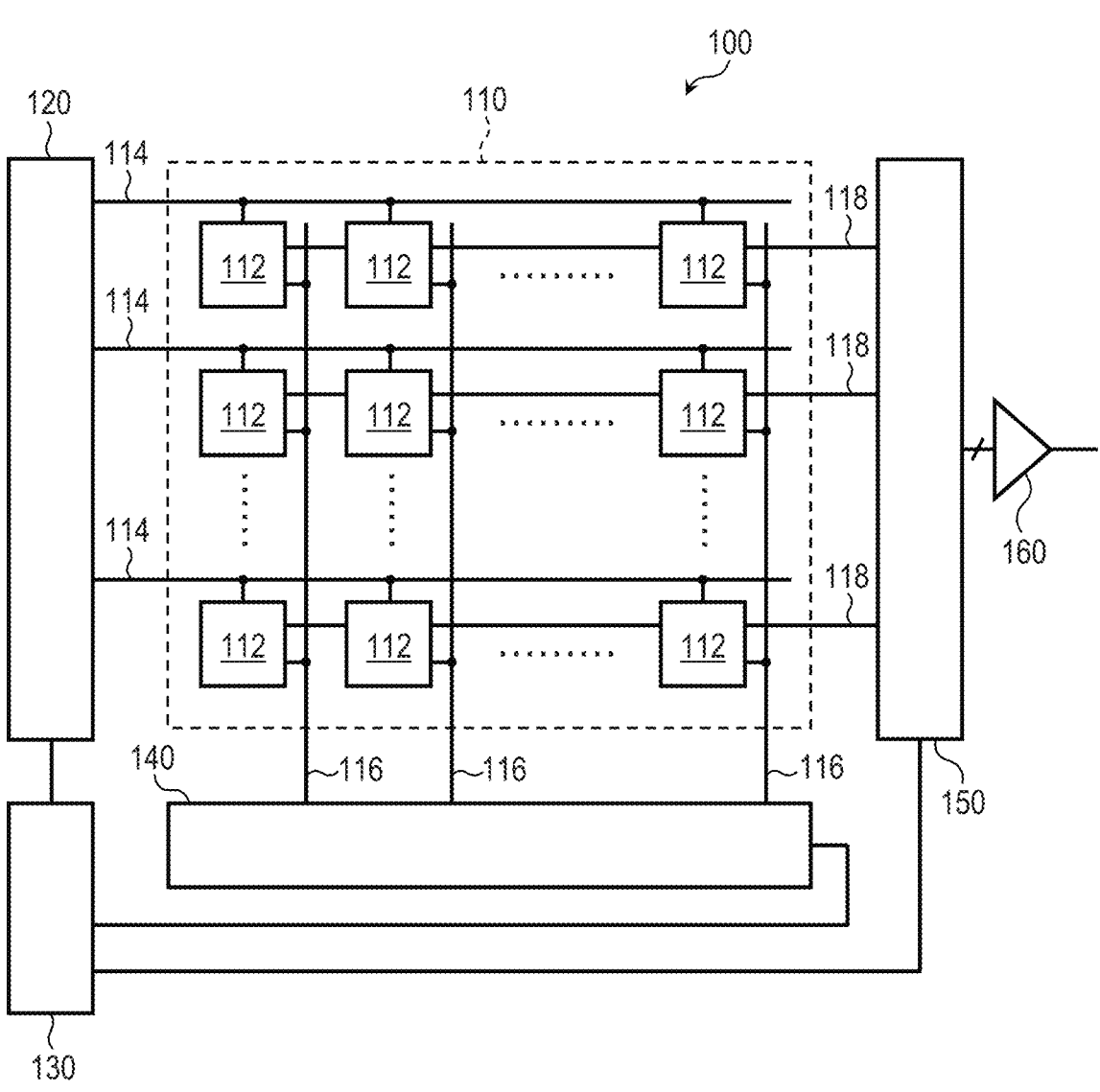
FIG. 11 is a block diagram illustrating a schematic configuration of a photoelectric conversion device according to a fourth embodiment of the present invention.

A photoelectric conversion device according to a fourth embodiment of the present invention will be described with reference to FIG. 11. The same components as those of the signal output devices according to the first to third embodiments are denoted by the same reference numerals, and description thereof will be omitted or simplified. FIG. 11 is a block diagram illustrating a schematic configuration of the photoelectric conversion device according to the present embodiment.

In the present embodiment, an example in which the configuration of the signal output device according to the first embodiment is applied to a photoelectric conversion device will be described. Although an example in which the signal output device according to the first embodiment is applied is described here, the signal output device according to the second or third embodiment may be similarly applied. The configuration of the signal output device according to the first to third embodiments is applicable not only to the photoelectric conversion device but also to various devices configured to output signals from a plurality of signal holding units.

The photoelectric conversion device 100 according to the present embodiment may include, as illustrated in, e.g., FIG. 11, a pixel region 110, a vertical driving circuit 120, a control circuit 130, a clock buffer circuit 140, a signal processing circuit 150, and an output circuit 160.

The pixel region 110 is provided with a plurality of pixels 112 arranged in an array so as to form a plurality of rows and a plurality of columns. Each pixel 112 is a functional block corresponding to the signal holding circuit 12 of the first to third embodiments, and may include a photoelectric conversion unit including a photoelectric conversion element and a pixel signal processing unit that processes a signal output from the photoelectric conversion unit. The number of pixels 112 included in the pixel region 110 is not particularly limited. For example, like a general digital camera, the pixel region 110 may be constituted by a plurality of pixels 112 arranged in an array of several thousand rows×several thousand columns. Alternatively, the pixel region 110 may include a plurality of pixels 112 arranged in one row or one column.

In each row of the pixel array of the pixel region 110, a control line 114 is arranged extending in a first direction (lateral direction in FIG. 11). Each of the control lines 114 is connected to the pixels 112 arranged in the first direction on the corresponding row, respectively, and forms a signal line common to these pixels 112. The first direction in which the control lines 114 extend may be referred to as a row direction or a horizontal direction. Each of the control lines 114 may include a plurality of signal lines for supplying a plurality of types of control signals to the pixels 112. The control line 114 of each row is connected to the vertical driving circuit 120. The control signals supplied from the vertical driving circuit 120 to the pixels 112 may include, for example, the control signals sel, clear, and WRT described in the second embodiment.

The pixels 112 arranged in each row of the pixel array of the pixel region 110 are connected in series in the first direction. An output line 118 is connected to an output node of the pixel 112 located at the end of each row in the first direction. The output line 118 of each row is connected to the signal processing circuit 150.

In each column of the pixel array of the pixel region 110, a signal line 116 is arranged so as to extend in a second direction (vertical direction in FIG. 11) intersecting the first direction. Each of the signal lines 116 is connected to the pixels 112 arranged in the second direction on the corresponding column, respectively, and forms a signal line common to these pixels 112.

The second direction in which the signal lines 116 extend may be referred to as a column direction or a vertical direction. The signal line 116 of each column is connected to the clock buffer circuit 140.

Similarly to the clock buffer circuits in the first to third embodiments, the clock buffer circuit 140 has a function of supplying a clock pulse to the pixels 112 in each column at a predetermined timing.

The signal processing circuit 150 is a functional block that performs predetermined signal processing on the pixel signals output from the output line 118 of each row. The signal processing performed by the signal processing circuit 150 is not particularly limited, and examples thereof include correction processing, binning processing, and addition averaging processing.

The output circuit 160 includes an external interface circuit, and is a functional block for outputting the pixel signals processed by the signal processing circuit 150 to the outside of the photoelectric conversion device 100. The external interface circuit included in the output circuit 160 is not particularly limited. As the external interface circuit, for example, a SerDes (SERializer/DESerializer) transmission circuit such as a LVDS (Low Voltage Differential Signaling) circuit or a SLVS (Scalable Low Voltage Signaling) circuit may be applied.

The control circuit 130 is a control circuit for generating control signals for controlling the operations and timings of the vertical driving circuit 120, the clock buffer circuit 140, and the signal processing circuit 150 and supplying them to the respective functional blocks. At least a part of the control signals for controlling the operations and timings of the vertical driving circuit 120, the clock buffer circuit 140, and the signal processing circuit 150 may be supplied from the outside of the photoelectric conversion device 100. The control signal supplied from the control circuit 130 to the clock buffer circuit 140 may include the clock signal described in the first to third embodiments.

As described above, according to the present embodiment, by applying the signal output devices according to the first to third embodiments, it is possible to realize a photoelectric conversion device capable of high-speed readout of pixel signals.

Fifth Embodiment

A photodetection system according to a fifth embodiment of the present invention will be described with reference to FIG. 12. FIG. 12 is a block diagram illustrating a schematic configuration of a photodetection system according to the present embodiment. In the present embodiment, a photodetection sensor to which the photoelectric conversion device 100 according to the fourth embodiment is applied will be described.

The photoelectric conversion device 100 described in the fourth embodiment is applicable to various photodetection systems. Examples of applicable photodetection systems include imaging systems such as digital still cameras, digital camcorders, surveillance cameras, copying machines, facsimiles, mobile phones, on-vehicle cameras, observation satellites, and the like. A camera module including an optical system such as a lens and an imaging device is also included in the photodetection system. FIG. 12 exemplifies a block diagram of a digital still camera as one of these.

The photodetection system 200 illustrated in FIG. 12 includes a photoelectric conversion device 201, a lens 202 that forms an optical image of an object on the photoelectric conversion device 201, an aperture 204 that changes an amount of light passing through the lens 202, and a barrier 206 that protects the lens 202. The lens 202 and the aperture 204 form an optical system that focus light onto the photoelectric conversion device 201. The photoelectric conversion device 201 is the photoelectric conversion device 100 described in the fourth embodiment, and converts the optical image formed by the lens 202 into image data.

The photodetection system 200 further includes a signal processing unit 208 that processes an output signal output from the photoelectric conversion device 201. The signal processing unit 208 generates image data from the digital signal output from the photoelectric conversion device 201. Further, the signal processing unit 208 performs various corrections and compressions as necessary and outputs the processed image data. The photoelectric conversion device

201 may include an AD conversion unit that generates a digital signal to be processed by the signal processing unit 208. The AD conversion unit may be formed on a semiconductor layer (semiconductor substrate) on which the photoelectric conversion element of the photoelectric conversion device 201 is formed, or may be formed on a semiconductor layer different from the semiconductor layer on which the photoelectric conversion element of the photoelectric conversion device 201 is formed. The signal processing unit 208 may be formed on the same semiconductor layer as the photoelectric conversion device 201.

The photodetection system 200 further includes a memory unit 210 for temporarily storing image data, and an external interface unit (external I/F unit) 212 for communicating with an external computer or the like. Further, the photodetection system 200 includes a storage medium 214 such as a semiconductor memory for performing storing or reading out of imaging data, and a storage medium control interface unit (storage medium control I/F unit) 216 for performing storing on or reading out from the storage medium 214. The storage medium 214 may be built in the photodetection system 200 or may be detachable. Communication between the storage medium control I/F unit 216 and the storage medium 214, and communication from the external I/F unit 212 may be performed wirelessly.

The photodetection system 200 further includes a general control/operation unit 218 that performs various calculations, and controls the entire digital still camera, and a timing generation unit 220 that outputs various timing signals to the photoelectric conversion device 201 and the signal processing unit 208. Here, the timing signal or the like may be input from the outside, and the photodetection system 200 may include at least the photoelectric conversion device 201 and the signal processing unit 208 that processes the output signal output from the photoelectric conversion device 201. The timing generation unit 220 may be mounted on the photoelectric conversion device 201. Further, the general control/operation unit 218 and the timing generation unit 220 may be configured to perform a part or all of the control functions of the photoelectric conversion device 201.

The photoelectric conversion device 201 outputs an imaging signal to the signal processing unit 208. The signal processing unit 208 performs predetermined signal processing on the imaging signal output from the photoelectric conversion device 201, and outputs the processed image data. The signal processing unit 208 generates an image using the imaging signal. The signal processing unit 208 may be configured to perform distance measurement calculation on a signal output from the photoelectric conversion device 201.

As described above, according to the present embodiment, by configuring the photodetection system using the photoelectric conversion device according to the fourth embodiment, it is possible to realize the photodetection system capable of quickly acquiring an image.

Sixth Embodiment

A range image sensor according to a sixth embodiment of the present invention will be described with reference to FIG. 13. FIG. 13 is a block diagram illustrating a schematic configuration of a range image sensor according to the present embodiment. In the present embodiment, a range image sensor will be described as an example of a photodetection system to which the photoelectric conversion device 100 according to the fourth embodiment is applied.

As illustrated in FIG. 13, the range image sensor 300 according to the present embodiment may include an optical system 302, a photoelectric conversion device 304, an image processing circuit 306, a monitor 308, and a memory 310. The range image sensor 300 receives light (modulated light or pulsed light) emitted from the light source device 320 toward an object 330 and reflected on the surface of the object 330, and acquires a distance image corresponding to the distance to the object 330.

The optical system 302 includes one or a plurality of lenses, and has a function of forming an image of image light (incident light) from the object 330 on a light receiving surface (sensor unit) of the photoelectric conversion device 304.

The photoelectric conversion device 304 is the photoelectric conversion device 100 described in the fourth embodiment, and has a function of generating a distance signal indicating the distance to the object 330 based on image light from the object 330 and supplying the generated distance signal to the image processing circuit 306.

The image processing circuit 306 has a function of performing image processing for constructing a distance image based on the distance signal supplied from the photoelectric conversion device 304.

The monitor 308 has a function of displaying a distance image (image data) obtained by image processing in the image processing circuit 306. The memory 310 has a function of storing (recording) a distance image (image data) obtained by image processing in the image processing circuit 306.

As described above, according to the present embodiment, by configuring the range image sensor using the photoelectric conversion device according to the fourth embodiment, it is possible to realize a range image sensor capable of acquiring a range image quickly.

Seventh Embodiment

An endoscopic surgical system according to a seventh embodiment of the present invention will be described with reference to FIG. 14.

Figure 14:
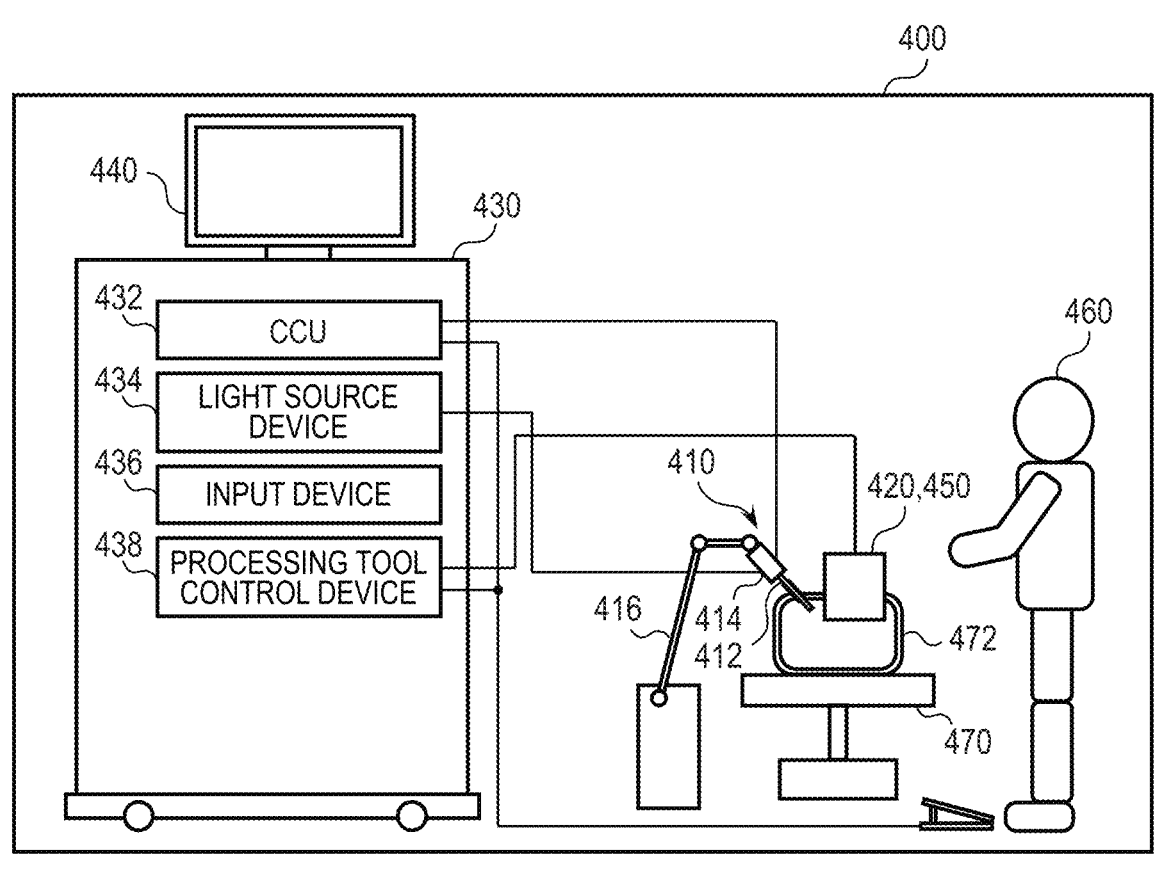
FIG. 14 is a schematic diagram illustrating a configuration example of an endoscopic surgical system according to a seventh embodiment of the present invention.

FIG. 14 is a schematic diagram illustrating a configuration example of an endoscopic surgical system according to the present embodiment. In the present embodiment, an endoscopic surgical system will be described as an example of a photodetection system to which the photoelectric conversion device 100 according to the fourth embodiment is applied.

FIG. 14 illustrates a state in which an operator (surgeon) 460 performs surgery on a patient 472 on a patient bed 470 using an endoscopic surgical system 400.

As illustrated in FIG. 14, the endoscopic surgical system 400 according to the present embodiment may include an endoscope 410, a surgical tool 420, and a cart 430 on which various devices for endoscopic surgery are mounted. A CCU (Camera Control Unit) 432, a light source device 434, an input device 436, a processing tool control device 438, a display device 440, and the like may be mounted on the cart 430.

The endoscope 410 includes a lens barrel 412 in which an area of a predetermined length from the tip is inserted into the body cavity of the patient 472, and a camera head 414 connected to the base end of the lens barrel 412. Although FIG. 14 illustrates an endoscope 410 configured as a so-called rigid mirror having a rigid lens barrel 412, the endoscope 410 may be configured as a so-called flexible mirror having a flexible lens barrel. The endoscope 410 is held in a movable state by an arm 416.

The tip of the lens barrel 412 is provided with an opening into which the objective lens is fitted. A light source device 434 is connected to the endoscope 410, and light generated by the light source device 434 is guided to the tip of the lens barrel 412 by a light guide extended inside the lens barrel 412, and is irradiated toward an observation target in the body cavity of the patient 472 through an objective lens. Note that the endoscope 410 may be a direct-viewing mirror, an oblique-viewing mirror, or a side-viewing mirror.

An optical system and a photoelectric conversion device (not illustrated) are provided inside the camera head 414, and reflected light (observation light) from the observation target is focused on the photoelectric conversion device by the optical system.

The photoelectric conversion device photoelectrically converts the observation light and generates an electrical signal corresponding to the observation light, that is, an image signal corresponding to the observation image. As the photoelectric conversion device, the photoelectric conversion device 100 described in the fourth embodiment may be used. The image signal is transmitted to the CCU 432 as RAW data.

The CCU 432 may be configured by a CPU (Central Processing Unit), a GPU (Graphics Processing Unit), and the like, and integrally controls the operations of the endoscope 410 and the display device 440. Further, the CCU 432 receives an image signal from the camera head 414, and performs various types of image processing for displaying an image based on the image signal, such as development processing (demosaic processing), on the image signal.

The display device 440 displays an image based on the image signal subjected to the image processing by the CCU 432 under the control of the CCU 432.

The light source device 434 may be configured by, e.g., a light source such as an LED (Light Emitting Diode), and supplies irradiation light to the endoscope 410 when photographing an image of a surgical part or the like.

The input device 436 is an input interface for the endoscopic surgical system 400.

The user may input various kinds of information and instructions to the endoscopic surgical system 400 via the input device 436.

The processing tool control device 438 controls the driving of the energy processing tool 450 for tissue ablation, incision, blood vessel sealing, or the like.

The light source device 434 that supplies the irradiation light to the endoscope 410 when imaging the surgical part may be configured by, for example, a white light source configured by an LED, a laser light source, or a combination thereof. When the white light source is configured by a combination of the RGB laser light sources, since the output intensity and the output timing of each color (each wavelength) may be controlled with high accuracy, the white balance of a captured image may be adjusted in the light source device 434. In addition, in this case, it is also possible to capture an image corresponding to each of RGB in a time division manner by irradiating the observation target with laser light from each of the RGB laser light sources in a time division manner and controlling driving of the imaging element of the camera head 414 in synchronization with the irradiation timing. According to this method, a color image may be obtained without providing a color filter in the image sensor.

Further, the driving of the light source device 434 may be controlled so as to change the intensity of light to be output every predetermined time. By controlling the driving of the image sensor of the camera head 414 in synchronization with the timing of the change of the intensity of the light to acquire an image in a time-division manner and synthesizing the image, it is possible to generate an image having a high dynamic range without so-called blacked up shadows and blown out highlights.

The light source device 434 may be configured to be capable of supplying light in a predetermined wavelength band corresponding to the special light observation. In the special light observation, for example, wavelength dependency of absorption of light in body tissue is utilized. Specifically, a predetermined tissue such as a blood vessel in the superficial layer of a mucous membrane is photographed with high contrast by irradiating light in a narrow band as compared with irradiation light (that is, white light) at the time of normal observation. Alternatively, in the special light observation, fluorescence observation in which an image is obtained by fluorescence generated by irradiation with excitation light may be performed. In the fluorescence observation, a body tissue is irradiated with excitation light to observe fluorescence from the body tissue, or a body tissue is locally injected with a reagent such as indocyanine green (ICG), and the body tissue is irradiated with excitation light corresponding to a fluorescence wavelength of the reagent to obtain a fluorescence image. The light source device 434 may be configured to be capable of supplying narrowband light and/or excitation light corresponding to such special light observation.

As described above, according to the present embodiment, by configuring the endoscopic surgical system using the photoelectric conversion device according to the fourth embodiment, it is possible to realize an endoscopic surgical system capable of quickly acquiring an image.

Eighth Embodiment

Figure 15A:
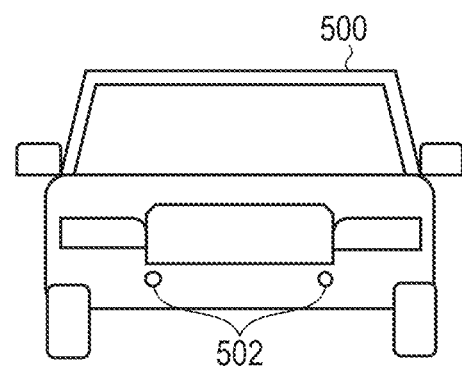
FIG. 15A, FIG. 15B, and FIG. 15C are schematic diagrams illustrating an example of a configuration of a movable object according to an eighth embodiment of the present invention.
Figure 15B:
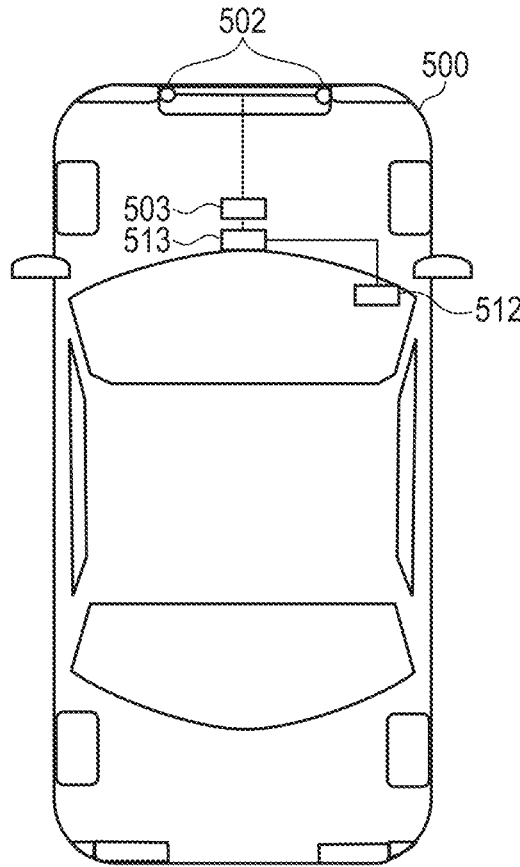
Figure 15C:
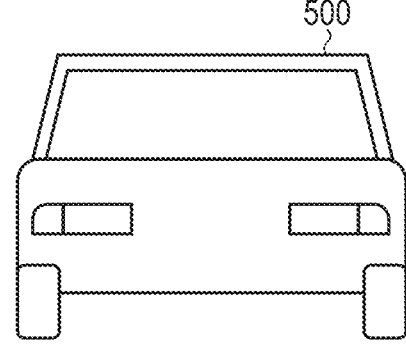
Figure 16:
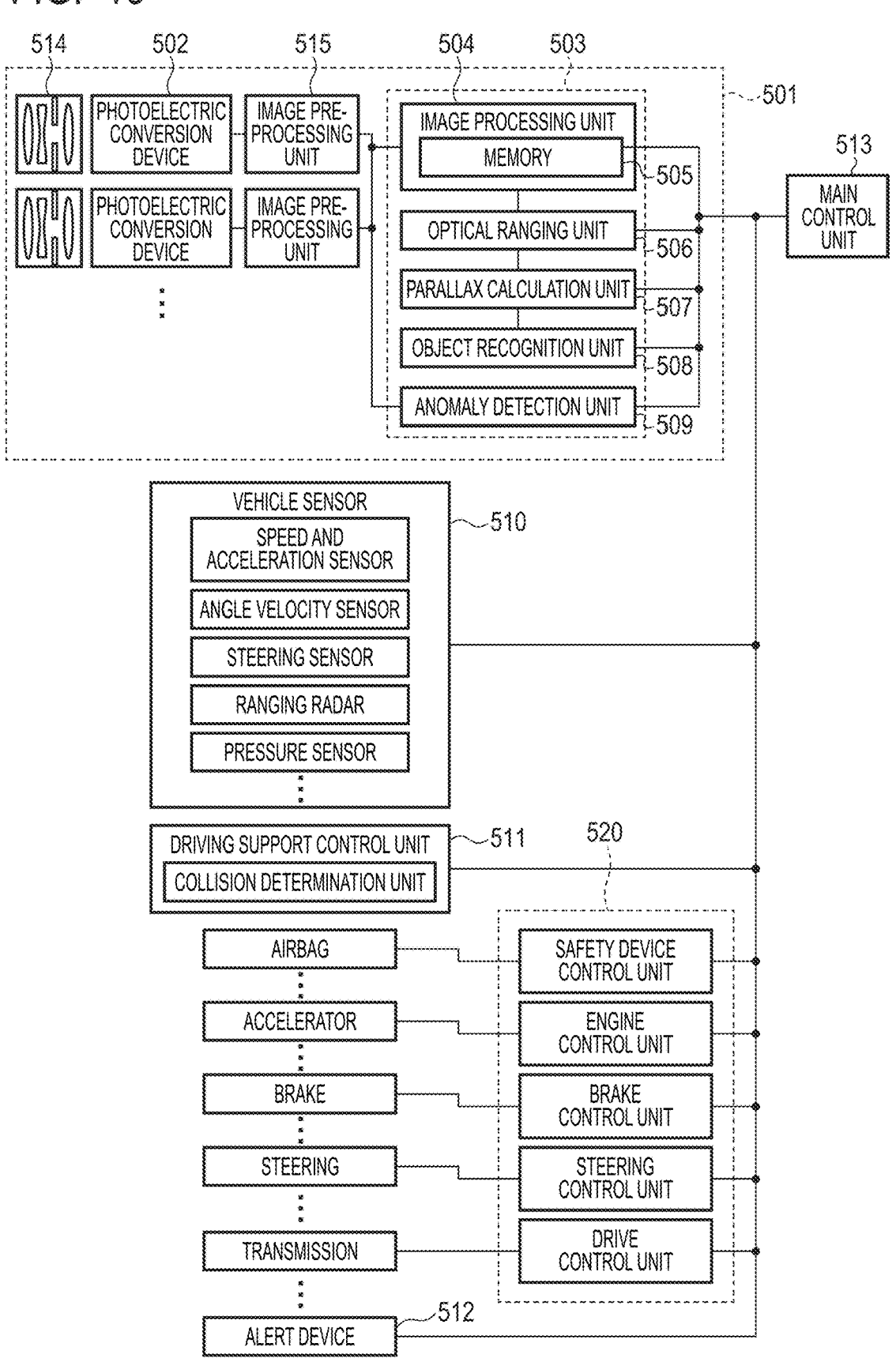
FIG. 16 is a block diagram illustrating a schematic configuration of a photodetection system according to the eighth embodiment of the present invention.
Figure 17:
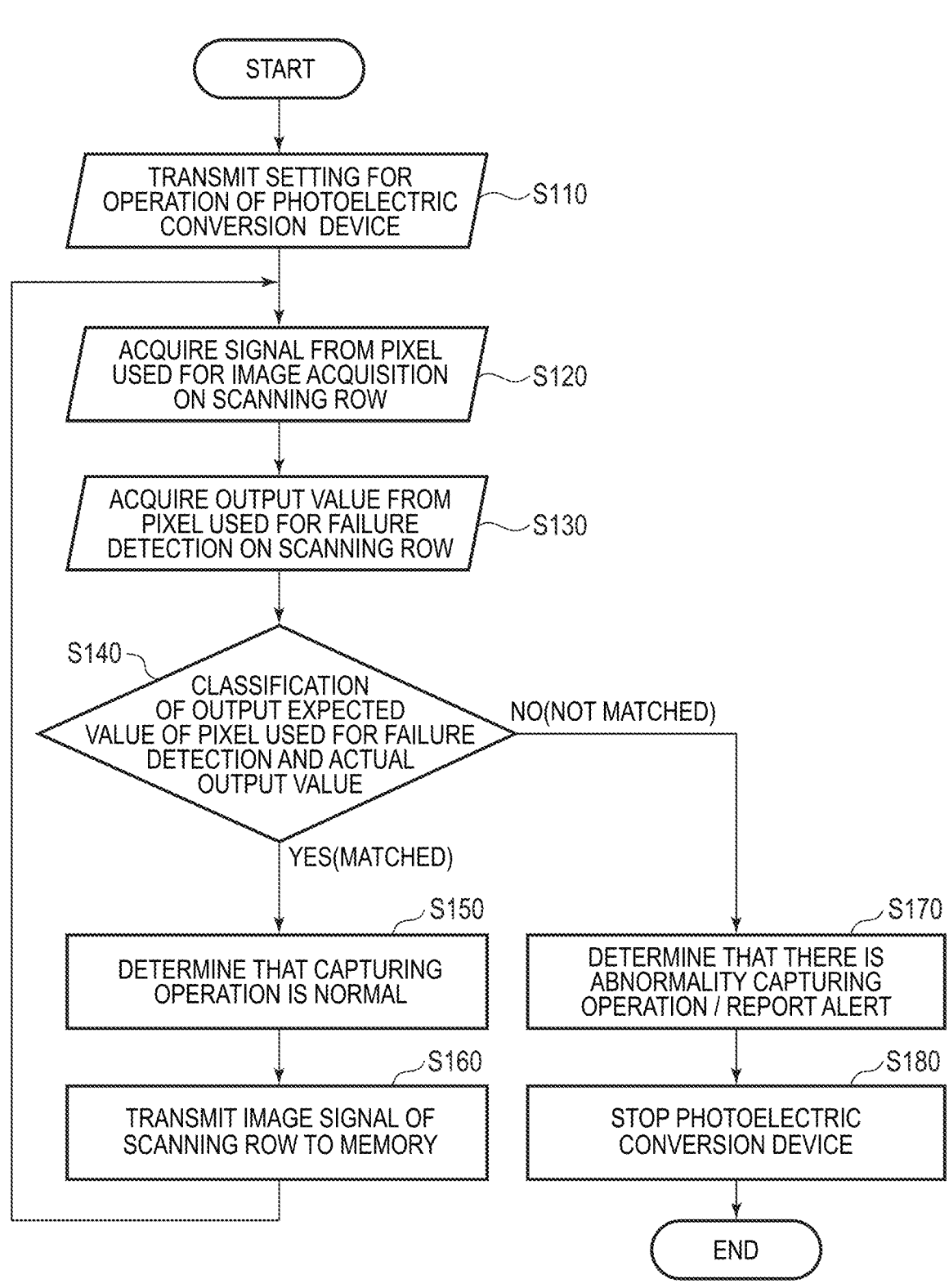
FIG. 17 is a flowchart illustrating the operation of the photodetection system according to the eighth embodiment of the present invention.

A photodetection system and a movable object according to an eighth embodiment of the present invention will be described with reference to FIG. 15A to FIG. 17. FIG. 15A to FIG. 15C are schematic diagrams illustrating configuration examples of a movable object according to the present embodiment. FIG. 16 is a block diagram illustrating a schematic configuration of a photodetection system according to the present embodiment. FIG. 17 is a flowchart illustrating an operation of the photodetection system according to the present embodiment. In the present embodiment, an application example to an on-vehicle camera will be described as a photodetection system to which the photoelectric conversion device 100 according to the fourth embodiment is applied.

FIG. 15A to FIG. 15C are schematic diagrams illustrating configuration example of a movable object (vehicle system) according to the present embodiment. FIG. 15A to FIG. 15C illustrate a configuration of a vehicle 500 (automobile) as an example of a vehicle system incorporating a photodetection system to which the photoelectric conversion device according to the fourth embodiment is applied. FIG. 15A is a schematic front view of the vehicle 500, FIG. 15B is a schematic plan view of the vehicle 500, and FIG. 15C is a schematic rear view of the vehicle 500. The vehicle 500 includes a pair of photoelectric conversion devices 502 on a front surface thereof. Here, the photoelectric conversion device 502 is the photoelectric conversion device 100 described in the fourth embodiment. The vehicle 500 includes an integrated circuit 503, an alert device 512, and a main control unit 513.

FIG. 16 is a block diagram illustrating a configuration example of the photodetection system 501 mounted on the vehicle 500. The photodetection system 501 includes a photoelectric conversion device 502, an image preprocessing unit 515, an integrated circuit 503, and an optical system 514. The photoelectric conversion device 502 is the photoelectric conversion device 100 described in the fourth embodiment. The optical system 514 forms an optical image of an object on the photoelectric conversion device 502. The photoelectric conversion device 502 converts the optical image of the object formed by the optical system 514 into an electrical signal. The image preprocessing unit 515 performs predetermined signal processing on the signal output from the photoelectric conversion device 502. The function of the image preprocessing unit 515 may be incorporated in the photoelectric conversion device 502. At least two sets of the optical system 514, the photoelectric conversion device 502, and the image preprocessing unit 515 are provided in the photodetection system 501, and an output from each set of the image preprocessing unit 515 is input to the integrated circuit 503.

The integrated circuit 503 is an integrated circuit for use in an imaging system application, and includes an image processing unit 504, an optical ranging unit 506, a parallax calculation unit 507, an object recognition unit 508, and an abnormality detection unit 509. The image processing unit 504 processes the image signal output from the image preprocessing unit 515. For example, the image processing unit 504 performs image processing such as development processing and defect correction on the output signal of the image preprocessing unit 515. The image processing unit 504 includes a memory 505 that temporarily stores the image signal. The memory 505 may store, for example, the position of a known defective pixel in the photoelectric conversion device 502.

The optical ranging unit 506 performs focusing and distance measurement of the object. The parallax calculation unit 507 calculates distance measurement information (distance information) from a plurality of image data (parallax images) acquired by the plurality of photoelectric conversion devices 502. Each of the photoelectric conversion devices 502 may have a configuration capable of acquiring various kinds of information such as distance information. The object recognition unit 508 recognizes an object such as a vehicle, a road, a sign, or a person.

Upon detecting an abnormality in the photoelectric conversion device 502, the abnormality detection unit 509 notifies the main control unit 513 of the abnormality.

The integrated circuit 503 may be realized by dedicatedly designed hardware, may be realized by a software module, or may be realized by a combination thereof. Further, it may be realized by FPGA (Field Programmable Gate Array), ASIC (Application Specific Integrated Circuit), or the like, or may be realized by a combination these.

The main control unit 513 integrally controls the operations of the photodetection system 501, the vehicle sensor 510, the control unit 520, and the like. The vehicle 500 may not include the main control unit 513.

In this case, the photoelectric conversion device 502, the vehicle sensor 510, and the control unit 520 transmit and receive control signals via a communication network. For example, the CAN (Controller Area Network) standard may be applied to the transmission and reception of the control signals.

The integrated circuit 503 has a function of receiving a control signal from the main control unit 513 or transmitting a control signal and a setting value to the photoelectric conversion device 502 by its own control unit.

The photodetection system 501 is connected to the vehicle sensor 510, and may detect a traveling state of the host vehicle such as a vehicle speed, a yaw rate, and a steering angle, an environment outside the host vehicle, and states of other vehicles and obstacles.

The vehicle sensor 510 is also a distance information acquisition unit that acquires distance information to the object. In addition, the photodetection system 501 is connected to a driving support control unit 511 that performs various kinds of driving support such as automatic steering, automatic traveling, a collision prevention function, and the like. In particular, with respect to the collision determination function, the driving support control unit 511 estimates collision with other vehicles or obstacles and determines whether or not there is a collision with other vehicles or obstacles based on the detection results of the photodetection system 501 and the vehicle sensor 510. Thus, avoidance control when a collision is estimated and activation of the safety device at the time of the collision are performed.

The photodetection system 501 is also connected to an alert device 512 that issues an alert to the driver based on the determination result of the collision determination unit. For example, when the determination result of the collision determination unit is that the possibility of a collision is high, the main control unit 513 performs vehicle control for avoiding a collision and reducing damage by applying a brake, returning an accelerator, suppressing engine output, or the like. The alert device 512 alerts the user by sounding an alarm such as a sound, displaying alert information on a display screen of a car navigation system, a meter panel, or the like, or vibrating a seat belt or a steering wheel.

In the present embodiment, an image of the surroundings of the vehicle, for example, the front or the rear, is captured by the photodetection system 501. FIG. 15B illustrates an arrangement example of the photodetection system 501 in a case where the photodetection system 501 captures an image in front of the vehicle.

As described above, the photoelectric conversion devices 502 are disposed in front of the vehicle 500. Specifically, it is preferable that a center line with respect to an advancing/retreating direction or an outer shape (for example, a vehicle width) of the vehicle 500 is regarded as a symmetry axis, and two photoelectric conversion devices 502 are disposed line-symmetrically with respect to the symmetry axis in order to acquire distance information between the vehicle 500 and an object to be imaged and determine a possibility of collision. In addition, the photoelectric conversion device 502 is preferably disposed so as not to interfere with the driver's visual field when the driver visually recognizes a situation outside the vehicle 500 from the driver's seat. The alert device 512 is preferably disposed so as to easily enter the field of view of the driver.

Next, a failure detection operation of the photoelectric conversion device 502 in the photodetection system 501 will be described with reference to FIG. 17. The failure detection operation of the photoelectric conversion device 502 may be performed in accordance with steps S110 to S180 illustrated in FIG. 17.

Step S110 is a step of performing setting at the time of start-up of the photoelectric conversion device 502. That is, the setting for the operation of the photoelectric conversion device 502 is transmitted from the outside of the photodetection system 501 (for example, the main control unit 513) or the inside of the photodetection system 501, and the imaging operation and the failure detection operation of the photoelectric conversion device 502 are started.

Next, in step S120, pixel signals are acquired from the effective pixels. In step S130, an output value from the failure detection pixel provided for failure detection is acquired. The failure detection pixel includes a photoelectric conversion element in the same manner as the effective pixel. A predetermined voltage is written to the photoelectric conversion element. The failure detection pixel outputs a signal corresponding to the voltage written in the photoelectric conversion element. Note that step S120 and step S130 may be reversed.

Next, in step S140, a classification of the output expected value of the failure detection pixel and the actual output value from the failure detection pixel is performed. As a result of the classification in step S140, when the output expected value matches the actual output value, the process proceeds to step S150, it is determined that the imaging operation is normally performed, and the process step proceeds to step S160. In step S160, the pixel signals of the scanning row are transmitted to the memory 505 and temporarily stored. After that, the process returns to step S120 to continue the failure detection operation. On the other hand, as a result of the classification in step S140, when the output expected value does not coincide with the actual output value, the process proceeds to step S170. In step S170, it is determined that there is an abnormality in the imaging operation, and an alert is notified to the main control unit 513 or the alert device 512. The alert device 512 causes the display unit to display that an abnormality has been detected. Thereafter, in step S180, the photoelectric conversion device 502 is stopped, and the operation of the photodetection system 501 is ended.

In the present embodiment, an example in which the flowchart is looped for each row is described, but the flowchart may be looped for each plurality of rows, or the failure detection operation may be performed for each frame. The alert of step S170 may be notified to the outside of the vehicle via a wireless network.

In addition, in the present embodiment, the control in which the own vehicle does not collide with other vehicles has been described, but the present invention is also applicable to control in which the own vehicle follows another vehicle and performs automatic driving, control in which the vehicle performs automatic driving so as not to protrude from a lane, and the like. Further, the photodetection system 501 is not limited to a vehicle such as an own vehicle, and may be applied to, for example, other movable object (mobile device) such as a ship, an aircraft, an industrial robot, or the like. In addition, the present invention is not limited to the movable object, and may be widely applied to equipment using object recognition, such as an ITS (Intelligent Transport Systems).

Ninth Embodiment

Figure 18A:
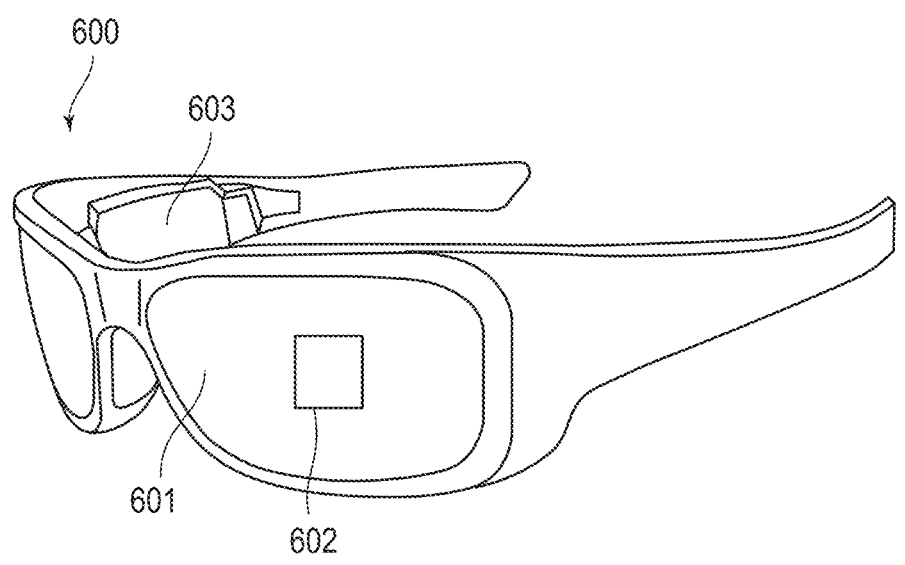
FIG. 18A and FIG. 18B are schematic diagrams illustrating a schematic configuration of a photodetection system according to a ninth embodiment of the present invention.
Figure 18B:
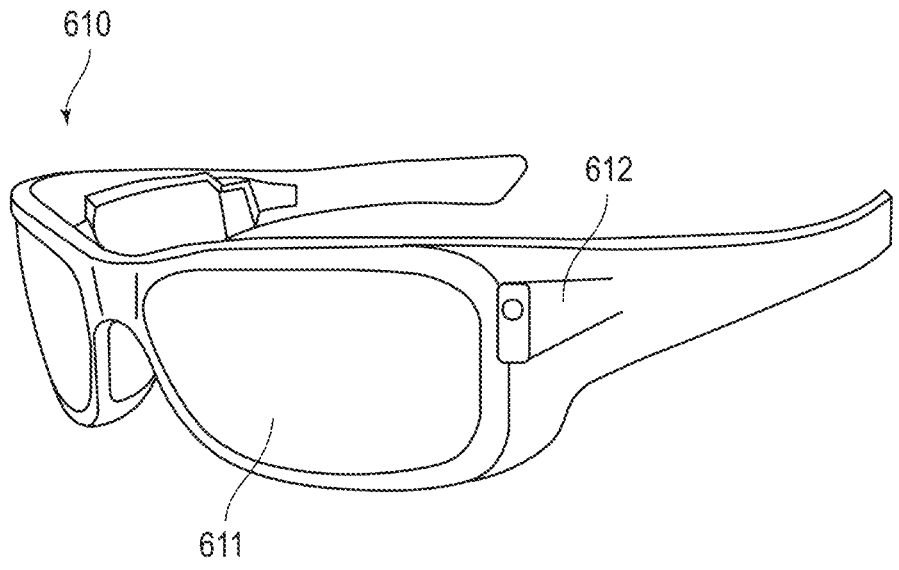

A photodetection system according to a ninth embodiment of the present invention will be described with reference to FIG. 18A and FIG. 18B. FIG. 18A and FIG. 18B are schematic diagrams illustrating a configuration example of the photodetection system according to the present embodiment. In the present embodiment, an application example to eyeglasses (smartglasses) will be described as a photodetection system to which the photoelectric conversion device 100 according to the fourth embodiment is applied.

FIG. 18A illustrates eyeglasses 600 (smartglasses) according to one application example. The eyeglasses 600 include lenses 601, a photoelectric conversion device 602, and a control device 603.

The photoelectric conversion device 602 is the photoelectric conversion device 100 described in the fourth embodiment, and is provided on the lens 601. One photoelectric conversion device 602 may be provided, or a plurality of photoelectric conversion devices may be provided. When a plurality of photoelectric conversion devices 602 are used, a combination of a plurality of types of photoelectric conversion devices 602 may be used. The arrangement position of the photoelectric conversion device 602 is not limited to FIG. 18A. A display device (not illustrated) including a light emitting device such as an OLED (Organic Light Emitting Diode) or an LED (Light Emitting Diode) may be provided on the back surface side of the lens 601.

The control device 603 functions as a power supply that supplies power to the photoelectric conversion device 602 and the display device. The control device 603 has a function of controlling the operations of the photoelectric conversion device 602 and the display device. The lens 601 is provided with an optical system for focusing light on the photoelectric conversion device 602.

FIG. 18B illustrates eyeglasses 610 (smartglasses) according to another application example. The eyeglasses 610 include lenses 611 and a control device 612. A photoelectric conversion device (not illustrated) corresponding to the photoelectric conversion device 602 and a display device may be mounted on the control device 612.

The lens 611 is provided with a photoelectric conversion device in the control device 612 and an optical system for projecting light from the display device, and an image is projected thereon. The control device 612 functions as a power supply that supplies power to the photoelectric conversion device and the display device, and has a function of controlling operations of the photoelectric conversion device and the display device.

The control device 612 may further include a line-of-sight detection unit that detects the line of sight of the wearer. In this case, an infrared light emitting unit is provided in the control device 612, and infrared light emitted from the infrared light emitting unit may be used for detection of a line of sight. Specifically, the infrared light emitting unit emits infrared light to the eyeball of the user who is watching the display image. A captured image of the eyeball is obtained by detecting reflected light of the emitted infrared light from the eyeball by an imaging unit having a light receiving element. By providing a reduction unit that reduces light from the infrared light emitting unit to the display unit in a plan view, it is possible to reduce degradation of image quality.

The line of sight of the user with respect to the display image may be detected from the captured image of the eyeball obtained by capturing the infrared light. Any known technique may be applied to the line-of-sight detection using the captured image of the eyeball. As an example, a line-of-sight detection method based on a Purkinje image due to reflection of irradiation light on the cornea may be used. More specifically, a line-of-sight detection process based on the pupil corneal reflection method is performed. The line of sight of the user may be detected by calculating a line-of-sight vector representing the orientation (rotation angle) of the eyeball based on the image of the pupil included in the captured image of the eyeball and the Purkinje image using the pupil corneal reflex method.

The display device according to the present embodiment may include a photoelectric conversion device having a light receiving element, and may be configured to control a display image based on the line-of-sight information of the user from the photoelectric conversion device. Specifically, the display device determines, based on the line-of-sight information, a first viewing area that the user gazes at and a second viewing area other than the first viewing area. The first viewing area and the second viewing area may be determined by a control device of the display device, or may be determined by an external control device. When the determination is made by the external control device, the determination result is transmitted to the display device via communication. In the display region of the display device, the display resolution of the first viewing area may be controlled to be higher than the display resolution of the second viewing area. That is, the resolution of the second viewing area may be lower than the resolution of the first viewing area.

The display area may include a first display area and a second display area different from the first display area, and a region having a high priority may be determined from the first display area and the second display area based on the line-of-sight information. The first display area and the second display area may be determined by a control device of the display device or may be determined by an external control device. When the determination is made by the external control device, the determination result is transmitted to the display device via communication. The resolution of the high priority region may be controlled to be higher than the resolution of the region other than the high priority region. That is, the resolution of the region having a relatively low priority may be lowered.

Note that the AI (Artificial Intelligence) may be used to determine the first viewing area or the area with a high priority. The AI may be a model configured to estimate an angle of the line of sight and a distance to a target object ahead of the line of sight from the image of the eyeball using the image of the eyeball and the direction in which the eyeball of the image is actually viewed as teacher data. The AI program may be included in the display device, the photoelectric conversion device, or the external device. When the external device has the information, the information is transmitted to the display device via communication.

In the case of performing display control based on visual recognition detection, the present invention may be preferably applied to smartglasses further including a photoelectric conversion device that captures an image of the outside. The smartglasses may display captured external information in real time.

Modified Embodiments

The present invention is not limited to the above-described embodiments, and various modifications are possible.

For example, an example in which a part of the configuration of any of the embodiments is added to other embodiments or an example in which a part of the configuration of any of the embodiments are substituted with some of the configurations of the other embodiments is also an embodiment of the present invention.

Further, in the first to third embodiments, in order to simplify the description, the signal held by each of the plurality of signal holding circuits 12 constituting the signal holding region 10 is a 1-bit signal, but the signal is not necessarily a 1-bit signal, and may be a multi-bit signal. For example, it is possible that the pulse signal output from the signal holding circuit 12 is counted, the count value is held in the memory 26, and a plurality of bits of the signal held in the memory 26 is transferred to the sequential circuit 28.

Embodiment(s) of the present disclosure can also be realized by a computer of a system or device that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or device by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a photoelectric conversion device including a plurality of pixel circuits, it is possible to reduce the time required to read out pixel signals.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-123110, filed Jul. 28, 2023, which is hereby incorporated by reference herein in its entirety.

What is claimed is:

1. A photoelectric conversion device comprising:
a plurality of pixel circuits arranged to form a plurality of rows and a plurality of columns; and
a control circuit configured to drive the plurality of pixel circuits,
wherein each of the plurality of pixel circuits includes
a signal generation circuit including a photoelectric conversion unit,
a memory configured to hold a signal output from the signal generation circuit, and
a sequential circuit including a first input node to which a signal from the memory is input, a second input node to which a control signal from the control circuit is input, a third input node, and an output node, and
wherein the plurality of pixel circuits includes a first pixel circuit and a second pixel circuit arranged in the same row or the same column, and the output node of the sequential circuit of the first pixel circuit is connected to the third input node of the sequential circuit of the second pixel circuit.

2. The photoelectric conversion device according to claim 1, wherein the plurality of pixel circuits includes a group of the pixel circuits arranged in the same row or the same column, and the sequential circuits of the pixel circuits constituting the group are connected in series so as to connect the output node and the third input node of the sequential circuits of the pixel circuits adjacent to each other.

3. The photoelectric conversion device according to claim 2, wherein the control circuit is configured to supply the control signal common to the pixel circuits of each column of two or more rows each including the group of the pixel circuits or the pixel circuits of each row of two or more columns each including the group of the pixel circuits.

4. The photoelectric conversion device according to claim 1, wherein the control circuit is configured to supply the control signal to the pixel circuits arranged in the same row or the same column via at least a part of a plurality of buffer circuits connected in series, and wherein the number of the buffer circuits through which the control signal supplied to the sequential circuit of the first pixel circuit passes is larger than the number of the buffer circuits through which the control signal supplied to the sequential circuit of the second pixel circuit passes.

5. The photoelectric conversion device according to claim 4, wherein each of the plurality of buffer circuits is configured by a non-inverting buffer circuit.

6. The photoelectric conversion device according to claim 4, wherein each of the plurality of buffer circuit is configured by an inverting buffer circuit, and wherein the sequential circuit of the first pixel circuit is configured to operate in synchronization with a rising edge of the control signal, and the sequential circuit of the second pixel circuit is configured to operate in synchronization with a falling edge of the control signal.

7. The photoelectric conversion device according to claim 4, wherein the control circuit further includes a logic circuit disposed between an output of the buffer circuit and the second input node of the sequential circuit of the corresponding pixel circuit for each of the plurality of buffer circuits.

8. The photoelectric conversion device according to claim 1, wherein the plurality of pixel circuits includes a first group and a second group of the pixel circuits arranged in the same row or the same column, and the sequential circuits of the pixel circuits constituting each of the first group and the second group are connected in series so as to connect the output node and the third input node of the sequential circuits of the pixel circuits adjacent to each other.

9. The photoelectric conversion device according to claim 8, wherein the pixel circuits constituting the first group and the pixel circuits constituting the second group are alternately arranged for each a predetermined number.

10. The photoelectric conversion device according to claim 8, wherein the control circuit is configured to output each of signals of the pixel circuits constituting the first group and each of signals of the pixel circuits constituting the second group in parallel.

11. The photoelectric conversion device according to claim 8, wherein the first group includes the first pixel circuit and the second pixel circuit, and the second group includes a third pixel circuit, wherein the control circuit is configured to supply the control signal to the pixel circuits arranged in the same row or the same column via at least a part of a plurality of buffer circuits connected in series, wherein the number of the buffer circuits through which the control signal supplied to the sequential circuit of the first pixel circuit passes is larger than the number of the buffer circuits through which the control signal supplied to the sequential circuit of the second pixel circuit passes, and wherein the number of the buffer circuits through which the control signal supplied to the sequential circuit of the second pixel circuit passes equals to the number of the buffer circuits through which the control signal supplied to the sequential circuit of the third pixel circuit passes.

12. The photoelectric conversion device according to claim 1, wherein the pixel circuit in which the output node of the sequential circuit is connected to the third input node of other pixel circuit is configured to output a holding signal via the other pixel circuit.

13. The photoelectric conversion device according to claim 1, wherein the sequential circuit is configured to hold the signal input from the memory to the first input node and output the held signal from the output node.

14. The photoelectric conversion device according to claim 1, wherein the sequential circuit is configured to hold a signal input from the third input node in response to the control signal input to the second input node and output the held signal from the output node.

15. A photoelectric conversion device comprising:

a plurality of pixel circuits arranged to form a plurality of rows and a plurality of columns; and a control circuit configured to drive the plurality of pixel circuits, wherein each of the plurality of pixel circuits includes a signal generation circuit including a photoelectric conversion unit, a memory configured to hold a signal output from the signal generation circuit, and a sequential circuit to which the signal is transferred from the memory, wherein the plurality of pixel circuits includes a first group and a second group each including two or more of the pixel circuits arranged in the same row, wherein the sequential circuits of the pixel circuits constituting each of the first group and the second group are connected in series along a row direction, and are configured to sequentially transfer the signals held by the respective pixel circuits from one side to the other side along the row direction in accordance with a control signal from the control circuit, and wherein the control circuit is configured to perform a signal transfer operation in the pixel circuits of the first group and a signal transfer operation in the pixel circuits of the second group in parallel by supplying a common control signal to the pixel circuits of the first group and the pixel circuits of the second group.

16. The photoelectric conversion device according to claim 15, wherein the pixel circuits constituting the first group and the pixel circuits constituting the second group are arranged in different rows.

17. The photoelectric conversion device according to claim 15, wherein the pixel circuits constituting the first group and the pixel circuits constituting the second group are arranged in the same row.

18. A signal output device comprising:

a plurality of signal holding circuits arranged to form a plurality of rows and a plurality of columns; and a control circuit configured to drive the plurality of signal holding circuits, wherein each of the plurality of signal holding circuits includes a memory configured to hold a predetermined signal, and a sequential circuit to which the signal is transferred from the memory, wherein the plurality of signal holding circuits includes a first group and a second group each including two or more of the signal holding circuits arranged in the same row, wherein the sequential circuits of the signal holding circuits constituting each of the first group and the second group are connected in series along a row direction, and are configured to sequentially transfer the signals held by the respective signal holding circuits from one side to the other side along the row direction in accordance with a control signal from the control circuit, and wherein the control circuit is configured to perform a signal transfer operation in the signal holding circuits of the first group and a signal transfer operation in the signal holding circuits of the second group in parallel by supplying a common control signal to the signal holding circuits of the first group and the signal holding circuits of the second group.

19. A method of driving a photoelectric conversion device including a plurality of pixel circuits arranged to form a plurality of rows and a plurality of columns, wherein each of the plurality of pixel circuits includes a signal generation circuit including a photoelectric conversion unit, a memory configured to hold a signal output from the signal generation circuit, and a sequential circuit to which the signal is transferred from the memory, wherein the plurality of pixel circuits includes a first group and a second group each including two or more of the pixel circuits arranged in the same row, and wherein the sequential circuits of the pixel circuits constituting each of the first group and the second group are connected in series along a row direction, the method comprising:

holding a signal based on charge generated in the photoelectric conversion unit by an incidence of light in the memory in each of the plurality of pixel circuits;

transferring the signal held in the memory to the sequential circuit in each of the plurality of pixel circuits; and sequentially transferring the signals held by the sequential circuits of the pixel circuits constituting each of the first group and the second group from one side to the other side along the row direction, wherein in the sequentially transferring, a signal transfer operation in the pixel circuits of the first group and a signal transfer operation in the pixel circuits of the second group are performed in parallel by supplying a common control signal to the pixel circuits of the first group and the pixel circuits of the second group.

20. The method of driving a photoelectric conversion device according to claim 19, wherein the sequentially transferring temporally overlaps the holding in the next frame.

21. A photodetection system comprising:

the photoelectric conversion device according to claim 1; and a signal processing device configured to process a signal output from the photoelectric conversion device.

22. The photodetection system according to claim 21, wherein the signal processing device generates a distance image representing distance information to an object based on the signal.

23. A movable object comprising:

the photoelectric conversion device according to claim 1;

a distance information acquisition unit configured to acquire distance information to an object from a parallax image based on a signal output from the photoelectric conversion device; and a control unit configured to control the movable object based on the distance information.

* * * * *